(12) United States Patent
Yao

(10) Patent No.: US 12,128,756 B2
(45) Date of Patent: Oct. 29, 2024

(54) SYSTEM FOR CONTROLLING VEHICLE

(71) Applicant: Illinois Tool Works Inc., Glenview, IL (US)

(72) Inventor: Minhu Yao, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 229 days.

(21) Appl. No.: 17/844,309

(22) Filed: Jun. 20, 2022

(65) Prior Publication Data

US 2022/0402356 A1  Dec. 22, 2022

(30) Foreign Application Priority Data

Jun. 21, 2021 (CN) .......................... 202110685537.6
Jun. 7, 2022 (CN) .......................... 202210641856.1

(51) Int. Cl.
*B60K 15/04* (2006.01)

(52) U.S. Cl.
CPC .. *B60K 15/0406* (2013.01); *B60K 2015/0425* (2013.01); *B60K 2015/0461* (2013.01); *B60K 2015/0474* (2013.01)

(58) Field of Classification Search
CPC ........ B60K 15/0406; B60K 2015/0425; B60K 2015/0461; B60K 2015/0474

(Continued)

(56) References Cited

FOREIGN PATENT DOCUMENTS

| DE | 102016124155 A1 | * | 6/2018 | ............. B60K 15/05 |
| DE | 102018115032 A1 | * | 12/2019 | ............. B60L 3/0046 |
| EP | 0804349 B1 | * | 10/1999 | ............. B60K 15/05 |

OTHER PUBLICATIONS

DE-102016124155-A1 (Irle, H) (Jun. 14, 2016) (Machine Translation) (Year: 2016).*

(Continued)

*Primary Examiner* — Mahmoud Gimie
(74) *Attorney, Agent, or Firm* — McAndrews, Held & Malloy, Ltd.

(57) ABSTRACT

The present disclosure relates to a fuel filler apparatus/charging port apparatus/hidden handle apparatus for a vehicle. The fuel filler apparatus/charging port apparatus has a fuel filler lid/charging port lid, and the hidden handle apparatus has a hidden door handle. The fuel filler apparatus/charging port apparatus/hidden handle apparatus includes actuation apparatus and actuation apparatus control unit. The actuation apparatus includes motor, where the motor has an open position, a closed position, and an intermediate position between the open position and the closed position, and the motor is configured to drive an actuation component to move between the open position and the closed position. The actuation apparatus control unit receives an opening signal and a closing signal from a body control module, the opening signal causes the actuation component to move to the open position, and the closing signal causes the actuation component to move to the closed position. The actuation apparatus control unit performs closed-loop control of the motor based on a proportional-integral-derivative control algorithm according to a temperature, a voltage, and a position of the motor, to precisely control the fuel filler lid (Continued)

apparatus/charging port lid apparatus/hidden handle apparatus to move between the open position and the closed position.

20 Claims, 16 Drawing Sheets

(58) Field of Classification Search
USPC .................................................... 296/97.22
See application file for complete search history.

(56) References Cited

OTHER PUBLICATIONS

DE-102018115032-A1 (Reichel, C) (Dec. 24, 2019) (Machine Translation) (Year: 2019).*

* cited by examiner

Temperature

Temperature

Temperature

| Voltage / Temperature | 16-15V | 15-14V | 14-13V | 13-12V | 12-11V | 11-10V | 10-9V |
|---|---|---|---|---|---|---|---|
| 90-60°C | 1.63 | 1.73 | 1.86 | 2 | 2.17 | 2.36 | 2.6 |
| 60-40°C | 2.84 | 3.03 | 3.25 | 3.5 | 3.79 | 4.14 | 4.55 |
| 40-25°C | 3.25 | 3.47 | 3.71 | 4 | 4.33 | 4.73 | 5.2 |
| 25-10°C | 3.66 | 3.9 | 4.18 | 4.5 | 4.88 | 5.32 | 5.85 |
| 10-(-)40°C | 4.88 | 5.2 | 5.57 | 6 | 6.5 | 7.09 | 7.8 |

FIG. 4E

| Voltage / Temperature | 16-15V | 15-14V | 14-13V | 13-12V | 12-11V | 11-10V | 10-9V |
|---|---|---|---|---|---|---|---|
| 90-60°C | 0.08 | 0.09 | 0.09 | 0.1 | 0.11 | 0.12 | 0.13 |
| 60-40°C | 0.14 | 0.15 | 0.16 | 0.175 | 0.19 | 0.21 | 0.23 |
| 40-25°C | 0.16 | 0.17 | 0.19 | 0.2 | 0.22 | 0.24 | 0.26 |
| 25-10°C | 0.18 | 0.2 | 0.21 | 0.225 | 0.24 | 0.27 | 0.29 |
| 10-(-)40°C | 0.24 | 0.26 | 0.28 | 0.3 | 0.33 | 0.35 | 0.39 |

FIG. 4F

| Voltage<br>Temperature | 16-15V | 15-14V | 14-13V | 13-12V | 12-11V | 11-10V | 10-9V |
|---|---|---|---|---|---|---|---|
| 90-60°C | 1.219 | 1.3 | 1.393 | 1.5 | 1.625 | 1.773 | 1.95 |
| 60-40°C | 0.902 | 0.962 | 1.031 | 1.11 | 1.203 | 1.312 | 1.443 |
| 40-25°C | 0.813 | 0.867 | 0.929 | 1 | 1.083 | 1.182 | 1.3 |
| 25-10°C | 0.723 | 0.771 | 0.826 | 0.89 | 0.964 | 1.052 | 1.157 |
| 10-(-)40°C | 0.406 | 0.433 | 0.464 | 0.5 | 0.542 | 0.591 | 0.65 |

FIG. 4G

SYSTEM FOR CONTROLLING VEHICLE

TECHNICAL FIELD

The present disclosure relates to a system for controlling a vehicle to drive a fuel filler lid apparatus/charging port lid apparatus/hidden handle apparatus of the vehicle.

BACKGROUND

In existing vehicles, an actuation apparatus is used to drive a fuel filler lid apparatus/charging port lid apparatus/hidden handle apparatus to move between an open position and a closed position thereof. The actuation apparatus includes a motor and an actuator driven by the motor. The actuator drives the fuel filler lid apparatus/charging port lid apparatus/hidden handle apparatus to move between the open position and the closed position. In a process of controlling the fuel filler lid apparatus/charging port lid apparatus/hidden handle apparatus, a system for controlling a vehicle on the vehicle detects a specific position of the lid or the handle by identifying a position (including the open position or the closed position) of the motor.

SUMMARY OF THE DISCLOSURE

The inventor recognizes through observation and analysis that in an existing vehicle, a control system is arranged separate from a fuel filler lid apparatus/charging port lid apparatus/hidden handle apparatus. To be specific, the control system in the existing vehicle is arranged outside the fuel filler lid apparatus/charging port lid apparatus/hidden handle apparatus (for example, arranged in a body control module (BCM/DC)). In such an arrangement, a control for the fuel filler lid apparatus/charging port lid apparatus/hidden handle apparatus is sourcing from the outside. Therefore, to transmit a (parameter) signal, an additional cable harness and receiving terminal are required to connect the separated control system to the fuel filler lid apparatus/charging port lid apparatus/hidden handle apparatus for communication. In addition, this is not applicable to closed-loop control.

The inventor recognizes through observation and analysis that such a structure has some disadvantages as follows:

(1) A limited number of parameter signals can be exchanged via a cable harness. This is because in real-time control, each parameter signal may require an additional communication cable.
(2) After a cable harness reaches a particular length, there is a voltage drop, and a parameter signal may be distorted, affecting stability of the control.
(3) Due to a delay and limitation in parameter collection and transmission, it is difficult to implement real-time closed-loop control.
(4) Due to limitations of the existing structure, in the existing control system, a motor is driven at a predetermined constant voltage. However, in the control system in the present disclosure, a motor is driven at a voltage that changes as a parameter changes.
(5) Poor scalability: When a control method, a control requirement, or a control parameter is changed, the structure of the system needs to be changed greatly.
(6) Since calculation and control are mostly completed at a master control point, many hardware and software resources on the master control point are occupied.
(7) A system parameter is difficult to meet requirements of different clients. For example, different clients may have different requirements on smoothness of motor operation, and a uniform system parameter cannot meet specific requirements of clients.

To overcome the above disadvantages, in the present disclosure, an actuation apparatus and an actuation apparatus control unit are integrated together (or integrated as a unit), and the actuation apparatus and the actuation apparatus control unit are set as a slave node 102 to form a closed-loop control system. The slave node communicates with a master node of the vehicle through a communication channel (LIN BUS).

In addition, in the present invention, an optimized algorithm is used, parameters such as a voltage, a temperature, a speed, and a position of the actuation apparatus are considered in the optimized algorithm, and the actuation apparatus is precisely controlled based on these parameters.

In the structure of the present disclosure, the actuation apparatus control unit dynamically captures changes of multiple related parameters of the motor and a power supply (including a change of a voltage of the power supply, a change of a position of the motor, and a change of a temperature of the motor) in real time, and outputs a control signal to the motor in real time according to the changes of these parameters based on an optimized control algorithm (that is, a proportional-integral-derivative (PID) control algorithm) in a closed-loop manner. In the present disclosure, the PID control algorithm continuously detects parameter feedbacks affecting the motor, including a change of a voltage of the power supply, a change of a position of the motor, and a change of a temperature of the motor. Based on these parameter feedbacks, the PID control algorithm continuously adjusts a position error of the motor. During real-time closed-loop control of the motor, the actuation apparatus control unit continuously receives a signal from the master node of the vehicle and returns a signal to the master node of the vehicle through a communication channel (LIN BUS).

The structure of integrating the actuation apparatus and the actuation apparatus control unit together in the present disclosure solves the prior-art technical problem that two systems separating from each other have many long cable harnesses and many connector terminals, and long cable harnesses cause a voltage drop and poor control stability. In addition, in the integrated system of the present disclosure, various control signals may be used, that is, a larger number of control signals and more types of control signals may be used, and these control signals cannot be accurately captured and provided in the two systems separating from each other in the prior art.

Specifically, the present disclosure discloses a system (100) for controlling a vehicle, including an opening/closing actuation apparatus (102), where the opening/closing actuation apparatus (102) of the vehicle includes: an actuation apparatus (112) including an actuation component (121) and a driving motor (122), where the driving motor (122) is configured to drive the actuation component (121); and an actuation apparatus control unit (114) for controlling the actuation apparatus (112); where the actuation apparatus control unit (114) performs closed-loop control of the actuation apparatus (112); and the opening/closing actuation apparatus (112) of the vehicle is set as a slave node (102), and the slave node (102) communicates with a master node (104) of the vehicle using a channel.

The actuation apparatus control unit (114) provides a driving output voltage signal to drive the motor (122) to move between an open position and a closed position, the actuation apparatus control unit (114) adjusts the driving output voltage signal in a closed-loop manner, and the adjustment of the driving output voltage signal is based on a temperature change and a power supply voltage change of the motor. The adjustment of the driving output voltage signal is based on a speed change in a motion trajectory of the motor. The adjustment of the driving output voltage signal is based on an error e(t) between a target position r(t) of the motor (122) and a current position y(t) of the motor (122). The adjustment of the driving output voltage signal is based on superposition of variables of three functions: (1) a first function: a proportional function of a current error e(t); (2) a second function: an accumulative function of errors e(t) at multiple time instances; and (3) a third function: a deviating function of the current error e(t) at a time instance. The variables of the three functions have respective gain constants: (1) a first gain constant: Kp; (2) a second gain constant: Ki; and (3) a third gain constant: Kd. The first gain constant Kp, the second gain constant Ki, and the third gain constant Kd are obtained based on a power supply voltage parameter and an ambient temperature parameter. The first gain constant Kp, the second gain constant Ki, and the third gain constant Kd are obtained based on a preset motion trajectory of the motor from an initial position to the target position.

The system for controlling a vehicle in the present disclosure further includes: a compensation table memory (410) storing a compensation table, where compensation values of the first gain constant Kp, the second gain constant Ki, and the third gain constant Kd are stored in the compensation table; and the actuation apparatus control unit (114) obtains the compensation values of the first gain constant Kp, the second gain constant Ki, and the third gain constant Kd from the compensation table according to a current temperature and a power supply voltage of the motor. The actuation apparatus control unit (114) includes a processor (706) configured to perform closed-loop control or regulation of the motor (122). The actuation apparatus control unit (114) is provided with slave control software (124). The actuation apparatus (112) is configured to drive a fuel filler lid apparatus (154)/charging port lid apparatus (155)/hidden handle apparatus (156) of the vehicle. The actuation apparatus (112), the actuation apparatus control unit (114), and the fuel filler lid apparatus (154)/charging port lid apparatus (155)/hidden handle apparatus (156) of the vehicle are physically arranged in one unit. The actuation component (121) drives the fuel filler lid apparatus (154), the charging port lid apparatus (155), or the hidden handle apparatus (156), such that the fuel filler lid apparatus (154), the charging port lid apparatus (155), or the hidden handle apparatus (156) moves between the open position and the closed position. The fuel filler lid apparatus (154), the charging port lid apparatus (155), or the hidden handle apparatus (156) has a calibration closed position (222) and a calibration open position (228); and the actuation component (121) drives the fuel filler lid apparatus (154), the charging port lid apparatus (155), or the hidden handle apparatus (156) to move between the calibration closed position (222) and the calibration open position (228). The fuel filler lid apparatus (154), the charging port lid apparatus (155), or the hidden handle apparatus (156) has a closed position lower limit (224) and an open position lower limit (226); a closed position state (223) is set between the calibration closed position (222) and the closed position lower limit (224); an intermediate position state (225) is set between the closed position lower limit (224) and the open position lower limit (226); and an open position state (227) is set between the open position lower limit (226) and the calibration open position (228); where according to a position state of the fuel filler lid apparatus (154), the charging port lid apparatus (155), or the hidden handle apparatus (156), the system (100) for controlling a vehicle controls the fuel filler lid apparatus (154), the charging port lid apparatus (155), or the hidden handle apparatus (156) to make them close and open.

The actuation apparatus control unit (114) in the present disclosure regulates and controls the motor (122) by changing a driving voltage. The system for controlling a vehicle in the present disclosure further includes: a temperature detection apparatus (714) configured to detect temperature of the motor; a position detection apparatus (716) configured to detect position of the motor (122); and a voltage detection apparatus (720) configured to detect voltage of the motor (122).

The concept, specific structures and resulting technical effects of the present disclosure are further described below in conjunction with the accompanying drawings so as to fully understand the objective, features and effects of the present disclosure.

BRIEF DESCRIPTION OF THE DRAWINGS

The present disclosure will be understood more easily when the following detailed description is read in conjunction with the accompanying drawings. Throughout the accompanying drawings:

FIG. 4E to FIG. 4G show gain compensation tables of Kp, Ki, and Kd generated according to the gain compensation curves shown in FIG. 4B to FIG. 4D;

DETAILED DESCRIPTION OF EMBODIMENTS

Various specific implementations of the present disclosure will be described below with reference to the accompanying drawings which constitute part of this description.

Figure 1:
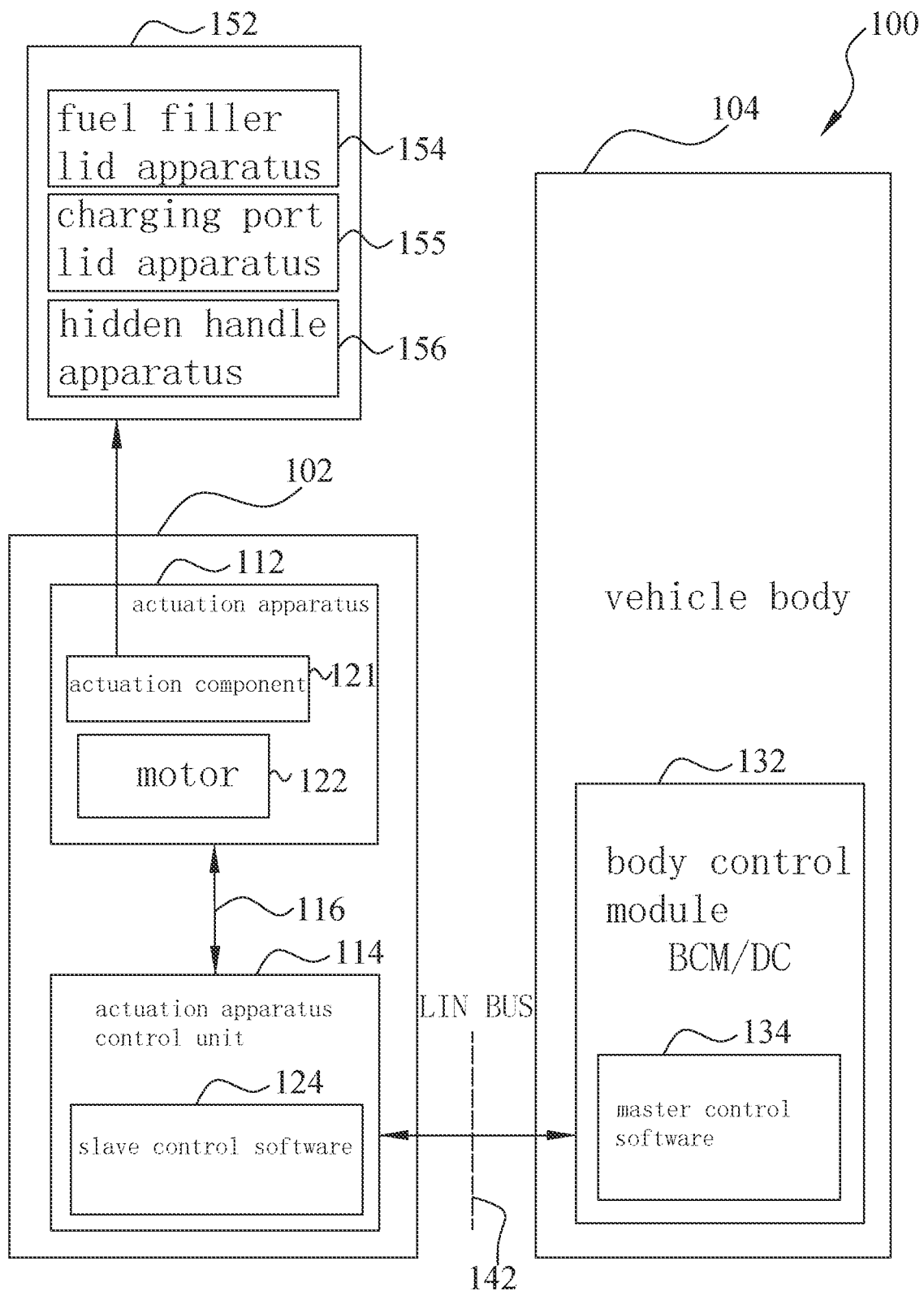
FIG. 1 is a block diagram of a system for a fuel filler lid/charging port lid/hidden vehicle handle of a vehicle according to the present disclosure.

FIG. 1 is a block diagram of a control system 100 for a fuel filler lid apparatus/charging port lid apparatus/hidden vehicle handle apparatus of a vehicle according to the present disclosure. As shown in FIG. 1, the control system 100 includes an opening/closing actuation apparatus 102, a vehicle body 104, and a fuel filler lid apparatus/charging port lid apparatus/hidden handle apparatus 152. The opening/closing actuation apparatus 102 is in a communication connection to the vehicle body 104 through a LIN bus (a communication channel) 142, and the opening/closing actuation apparatus 102 controls opening and closing of the fuel filler lid apparatus/charging port lid apparatus/hidden handle apparatus 152.

The opening/closing actuation apparatus 102 includes an actuation apparatus 112 and an actuation apparatus control unit 114. The actuation apparatus 112 is in a communication connection to the actuation apparatus control unit 114 via a connection 116. The actuation apparatus 112 includes an actuation component 121 and a motor 122. The actuation component 121 is provided with a transmission and drive mechanism (not shown in FIG. 1), and the motor 122 is configured to drive the transmission and drive mechanism in the actuation component 121. The transmission and drive mechanism in the actuation component 121 is configured to drive a lid or a handle in the fuel filler lid apparatus/charging port lid apparatus/hidden handle apparatus 152.

The actuation apparatus control unit 114 includes slave control software 124. The actuation apparatus control unit 114 controls start and stop and operating speed of the motor 122 by running the slave control software 124. The actuation component 121 has an open position, a closed position, and an intermediate position between the open position and the closed position. Correspondingly, the motor 122 also has an open position, a closed position, and an intermediate position between the open position and the closed position. The motor 122 is configured to drive the actuation component 121 to move between the open position and the closed position.

The fuel filler lid apparatus/charging port lid apparatus/hidden handle apparatus 152 includes a fuel filler lid apparatus 154/charging port lid apparatus 155/hidden handle apparatus 156 on the vehicle body. The fuel filler lid apparatus 154/charging port lid apparatus 155 on the vehicle body is provided with a lid. The lid is mechanically connected to the actuation component 121 and is configured to cover or open a fuel filler in the fuel filler lid apparatus 154/a charging port in the charging port lid apparatus 155. When the actuation component unit 121 is in the open position, the lid is in an open position. In this case, a user can refuel/charge the vehicle through the fuel filler/charging port. When the actuation component unit 121 is in the closed position, the lid is in a covering position. In this case, a user cannot refuel/charge the vehicle through the fuel filler/charging port. When the actuation component unit 121 moves between the open position and the closed position, the lid is correspondingly driven to move between the covering position and the open position thereof by the actuation component unit 121.

The hidden handle apparatus 156 of the vehicle is provided with a hidden handle. The hidden handle is mechanically connected to the actuation component 121, and may move between a protruding position and a hidden position. When the hidden handle is in the protruding position, the handle protrudes outwards from the surface of the vehicle body, such that a user can pull it outwards to open a door of the vehicle. When the hidden handle is in the hidden position, the handle and the surface of the vehicle body are substantially flush, thereby improving the integrity of the appearance of the vehicle. When the actuation component 121 is in the open position, the hidden handle is in the protruding position. When the actuation component 121 is in the closed position, the hidden handle is in the hidden position. When the actuation component 1121 moves between the open position and the closed position, the handle is correspondingly driven to move between the protruding position and the hidden position thereof by the actuation component.

The vehicle body 104 includes a body control module (BCM/DC) 132, and the body control module 132 includes master control software 134. The master control software 134 in the body control module 132 and the slave control software 124 in the actuation apparatus control unit 114 perform bidirectional communication through the bus (LIN BUS) 142.

After receiving a signal from the body control module 132, the actuation apparatus control unit 114 moves the actuation component 121 from the open position to the closed position or from the closed position to the open position. In this case, the actuation apparatus control unit 114 captures a parameter (such as a voltage, a temperature, or a position) at the actuation component 121, and performs closed-loop control or adjustment control of motion of the motor 122 based on the captured parameter, so as to perform closed-loop control or adjustment to the movement of the actuation component 121.

Figure 2:
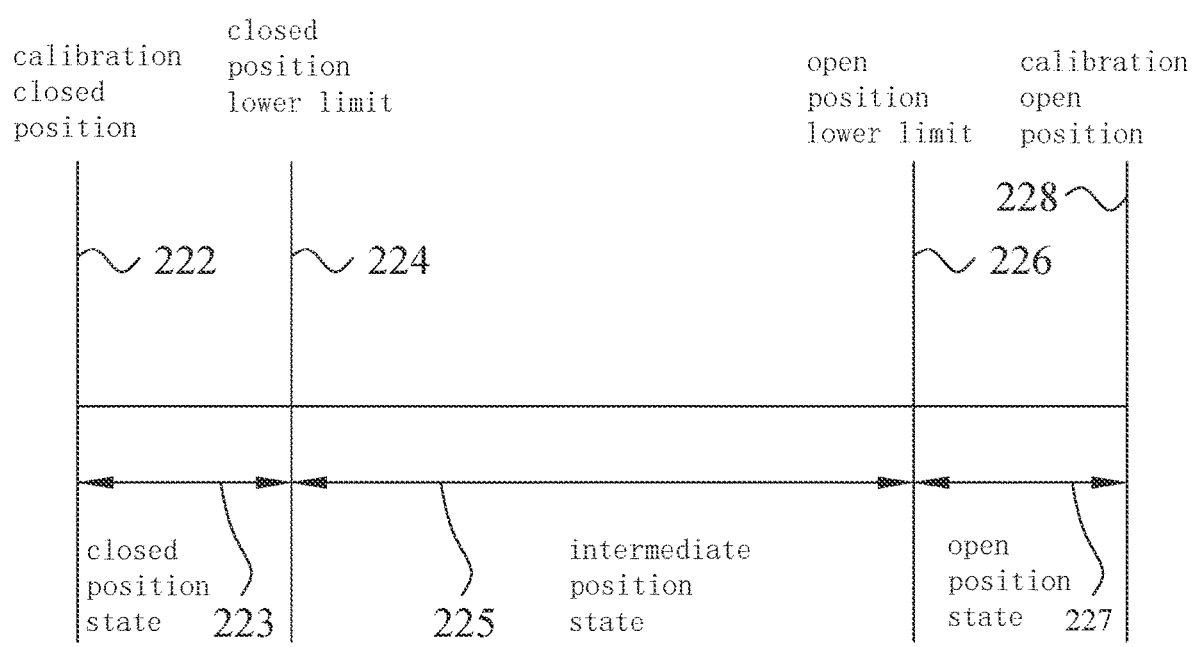
FIG. 2 is a diagram of position states of an actuation component.

FIG. 2 is a diagram of a position state of the actuation component 121. As shown in FIG. 2, positions of the actuation component 121 include two end point limit positions (a calibration open position 228 and a calibration closed position 222). There are two intermediate point positions (an open position lower limit 226 and a closed position lower limit 224) between the two end point limit positions. The calibration open position 228, the calibration closed position 222, the open position lower limit 226, and the closed position lower limit 224 are set by system software, where the calibration open position 228 and the calibration closed position 222 are an open position and a closed position within an allowable error range. When the actuation component 121 is between the calibration open position 228 and the open position lower limit 266, the system determines that the actuation component 121 is in an open position state 227. When the actuation component 121 is between the calibration closed position 222 and the closed position lower limit 224, the system determines that the actuation component 121 is in a closed position state 223. When the actuation component 121 is between the open position lower limit 226 and the closed position lower limit 224, the system determines that the actuation component 112 is in an intermediate position state 225. In the present disclosure, the actuation apparatus control unit 114 controls the motor 122 according to a position state of the motor illustrated in FIG. 2.

Figure 3:
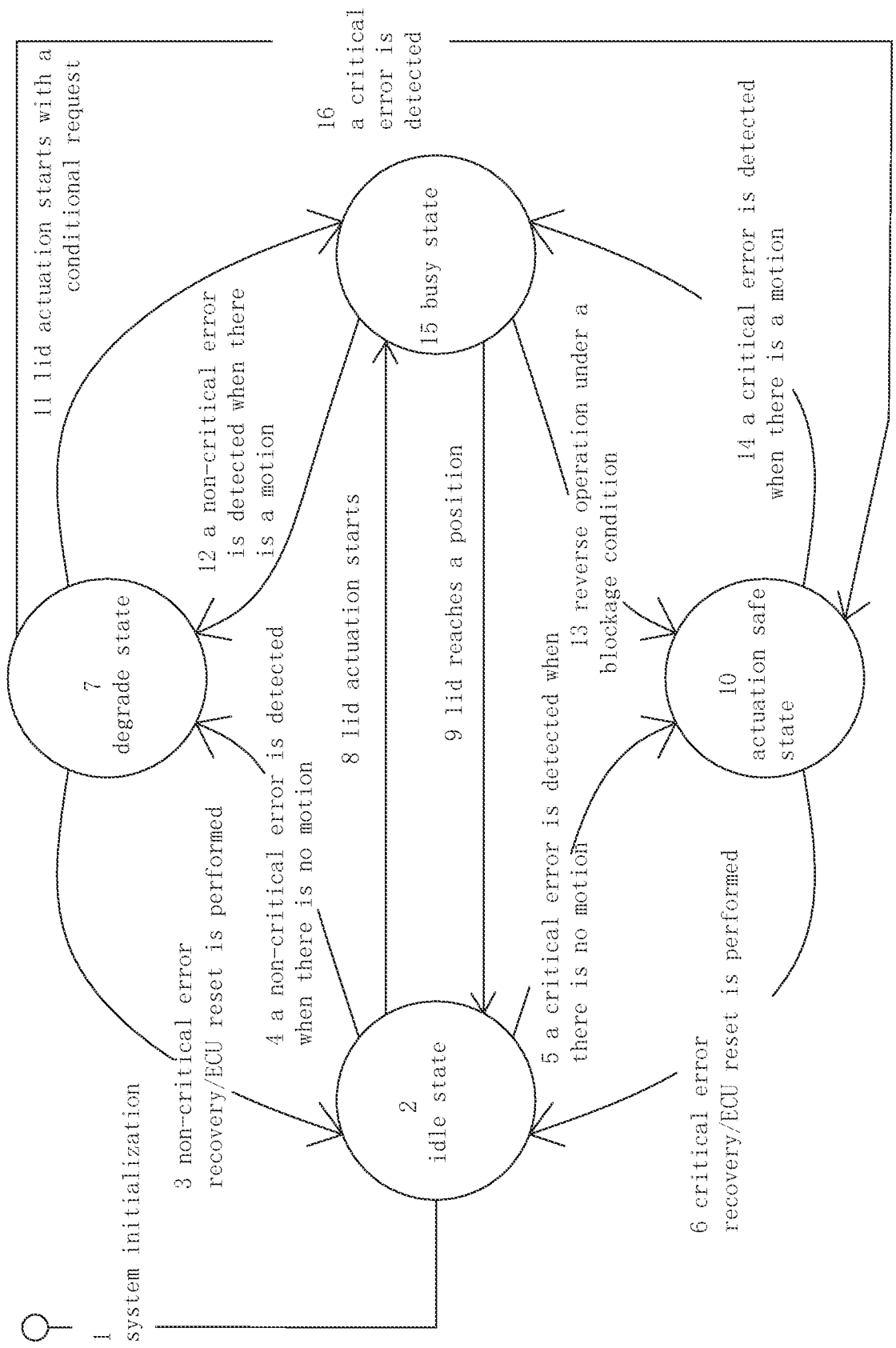
FIG. 3 is a state transition diagram of operation of a motor.

FIG. 3 is a state transition diagram of operation of the motor 122. As shown in FIG. 3, the motor 122 has four operation states: an idle state 2, a busy state 15, an actuation safe state 10, and a degrade state 7. The idle state 2 indicates that the motor is in an actuatable state. The busy state 15 indicates that the motor is in an actuation state. The actuation safe state 10 indicates that the motor is in a non-actuatable state due to a critical error. The degrade state 7 indicates that the motor is in a limited actuation state due to a non-critical error, that is, can perform a limited actuation action. The motor 122 switches between the four operation states. When the motor 122 is in one of the operation states and a particular condition is triggered, the motor 122 will switch to another operation state.

After system initialization 1, if the actuation component control unit 114 fails to detect error relating to driving, the motor 122 will enter the idle state 2. In this case, the motor performs no actuation motion. When the motor 122 is in the idle state 2 and lid actuation starts 8, the motor 122 will switch from the idle state 2 to the busy state 15. When the motor 122 is in the idle state 2 and a non-critical error is detected when there is no motion 4, the motor 122 will switch from the idle state 2 to the degrade state 7. When the motor 122 is in the idle state 2 and a critical error is detected when there is no motion 5, the motor 122 will switch from the idle state 2 to the actuation safe state 10.

When the motor 122 is in the busy state 15, the motor 122 performs an actuation motion. When the motor 122 is in the busy state 15 and a non-critical error is detected when there is a motion 12, the motor 122 will switch from the busy state 15 to the degrade state 7. When the motor 122 is in the busy state 15 and a critical error is detected when there is a motion 14, the motor 122 will switch from the busy state 15 to the actuation safe state 10. When the motor 122 is in the busy state 15 and the lid reaches a position 9, the motor 122 will switch from the busy state 15 back to the idle state 2.

When the motor 122 is in the degrade state 7, the motor 122 may only perform a limited actuation motion. When the motor 122 is in the degrade state 7 and non-critical error recovery/ECU reset is performed, the motor 122 will switch from the degrade state 7 to the idle state 2. When the motor 122 is in the degrade state 7 and lid actuation starts with a conditional request 11, the motor 122 will switch from the degrade state 7 to the actuation busy state 15. When the motor 122 is in the degrade state 7 and a critical error is detected 16, the motor 122 will switch from the degrade state 7 to the actuation safe state 10.

When the motor 122 is in the actuation safe state 10, the motor 122 cannot perform an actuation motion. When the motor 122 is in the actuation safe state 10 and critical error recovery/ECU reset is performed, the motor 122 will switch from the actuation safe state 10 to the idle state 2. When the motor 122 is in the actuation safe state 10 and there is reverse operation under a blockage condition 13, the motor 122 will switch from the actuation safe state 10 to the actuation busy state 15.

Due to the structural framework of the present disclosure, the actuation apparatus control unit 114 can control the motor 122 in real time according to the conditions 3, 4, 5, 6, 8, 9, 11, 12, 13, 14, and 16 shown in FIG. 3, such that the actuation component 121 is controlled in real time. During the control of the motor 122, the actuation component 121 dynamically corrects an error offset of the motor 122 in a motion state and a static state according to a captured parameter (such as a power supply voltage, a temperature of the motor, or a position of the motor) based on an optimized algorithm, such that the motor 122 can be controlled more precisely. In the present disclosure, the actuation apparatus control unit 114 controls the motor 122 according to the state transition diagram of the motor illustrated in FIG. 3.

Figure 4A:
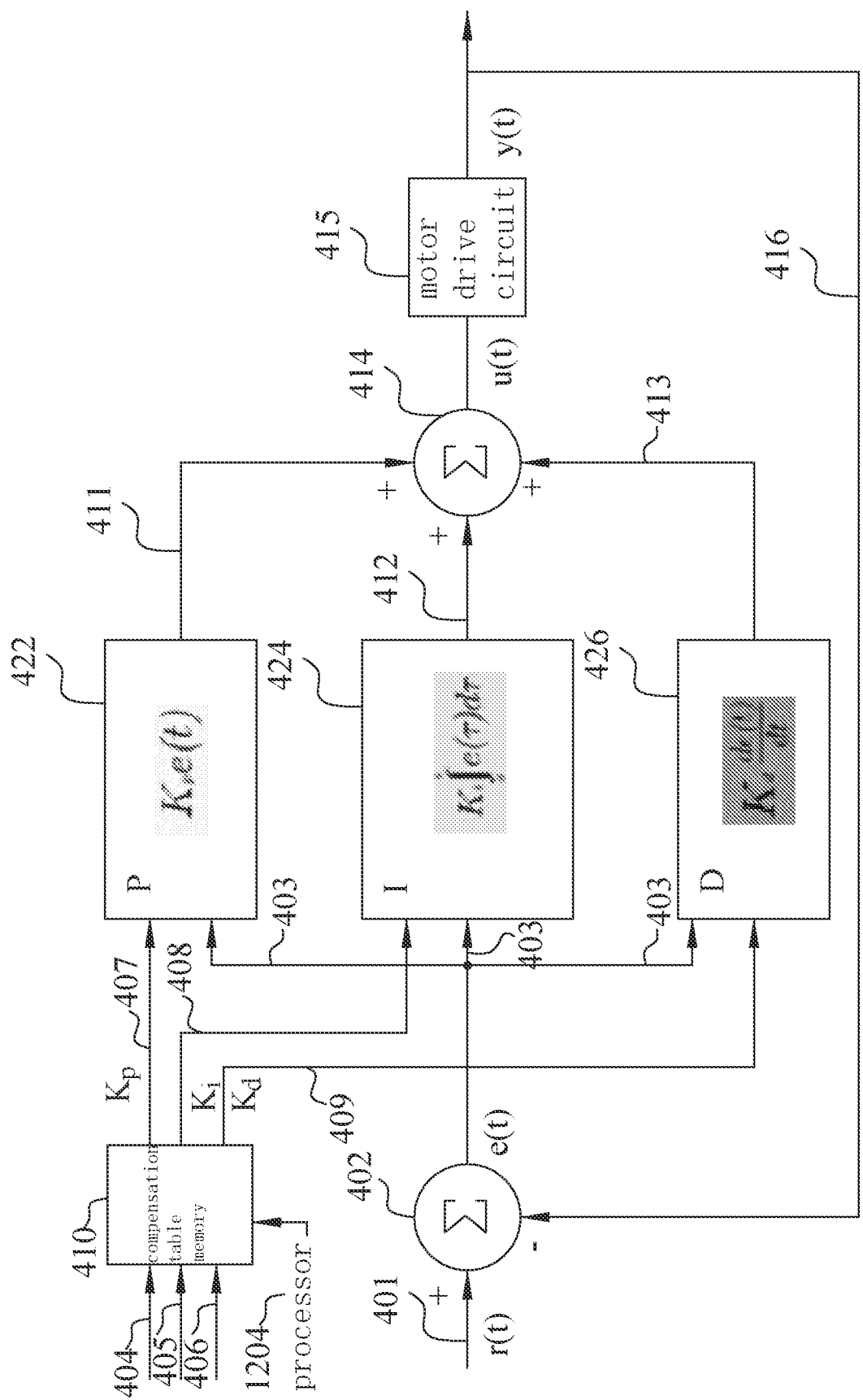
FIG. 4A is a diagram of a PID algorithm for motor control.

FIG. 4A shows an algorithm for motor control. As shown in FIG. 4A, a proportional-integral-derivative controller (PID controller) is a feedback-based control circuit actuator. The PID controller may obtain feedback data from a loop to eliminate an error offset of the motor 122 in a motion state and a static state. According to this embodiment of the present disclosure, the motor 122 in the actuation apparatus 112 may be controlled based on two PID algorithms (an absolute PID algorithm and an incremental PID algorithm).

As shown in FIG. 4A, in the case of the "absolute PID algorithm", a mathematical formula may be expressed as:

$$u(k)=K_P e(k)+K_I \Sigma_{i=0} e(i)+K_D[e(k)-e(k-1)]$$

wherein, Kp represents a proportional gain and is a first adjustment parameter of the motor, Ki represents an integral gain and is a second adjustment parameter of the motor, Kd represents a derivative gain and is a third adjustment parameter of the motor, e(k) represents an error between an actual position and a target position of the motor at current time instance, and e(k−1) represents an error between an actual position and a target position of the motor at previous time instance. An output u(k) of the above control function is an absolute PWM value, where i changes from 0 to n, 0 represents an initial time instance, and n represents n-th time instance.

Besides, closed-loop control may be performed on the motor 122 based on the "incremental PID algorithm". In the case of the "incremental PID algorithm", a mathematical formula may be expressed as:

$$\Delta u(k)=u(k)-u(k-1)=K_P[e(k)-e(k-1)]+K_I e(k)+K_D[e(k)-2e(k-1)+e(k-2)]$$

wherein, Kp represents a proportional gain and is a first adjustment parameter of the motor, Ki represents an integral gain and is a second adjustment parameter of the motor, Kd represents a derivative gain and is a third adjustment parameter of the motor, e(k) represents an error between an actual position and a target position of the motor at current time instance, and e(k−1) represents an error between an actual position and a target position of the motor at previous time instance. An output Δu(k) of the above control function is a relative PWM value. Since the charging port lid is driven within the range of 0° to 360° and this is the maximum rotation angle of the motor 122, the "incremental PID method" algorithm is more suitable for closed-loop control of the motor 122. The above two PID algorithms may be implemented by computer software.

The inventors now describes a node operation flow in FIG. 4A as follows:

r(t) is received at an input of a node 402 via a connection 401, and r(t) represents a desired (target) position value (that is, the open position or the closed position) of the motor 122. The node 402 receives y(t) via a connection 416. y(t) includes an actual (current) position value, a voltage value, and a current value of the motor, where the voltage value and the current value of the motor are used for fault diagnosis detection. According to the desired position value of the motor in r(t) and the actual position value of the motor in y(t), the node 402 outputs a position error e(t) of the motor at current time instance, and transmits the position error e(t) of the motor to a P arithmetic operation 422, an I arithmetic operation 424, and a D arithmetic operation 426 via connections 403.

As shown in FIG. 4A, the P arithmetic operation 422, the I arithmetic operation 424, and the D arithmetic operation 426 use three gain constants (or weight constants) Kp, Ki, and Kd respectively. Kp represents a linear gain of the position error e(t), and is used to adjust a motion direction and an approximate position of the motor. Ki represents an integral gain of the error e(t) in time, and is used to correct an accumulated position error of the motor. Since integrating an error in time increases an accumulated error when an angle error is small, Ki can effectively correct the accumulated position error of the motor. Kd represents an angle error per unit time, that is, an angle difference between previous time instance and next time instance, and represents rate change of the motor. Kd can effectively adjust rate of the motor.

As shown in FIG. 4A, a compensation table memory 410 stores multiple compensation tables. FIG. 4E to FIG. 4G show three schematic compensation tables. The processor 1204 selects corresponding gain constants Kp, Ki, and Kd from the compensation tables in the compensation table memory 410 according to a current temperature and a current power supply voltage of the motor, and inputs the corresponding gain constants to the P arithmetic operation 422, the I arithmetic operation 424, and the D arithmetic operation 426 via connections 407, 408, and 409 respectively. Kp, Ki, and Kd gain compensation tables may be obtained through a limited number of experiments. The compensation table memory 410 may be included in a memory 1218 in FIG. 11. A person skilled in the art should understand that blocks in FIG. 4A may be implemented either by software or by hardware.

Figure 4B:
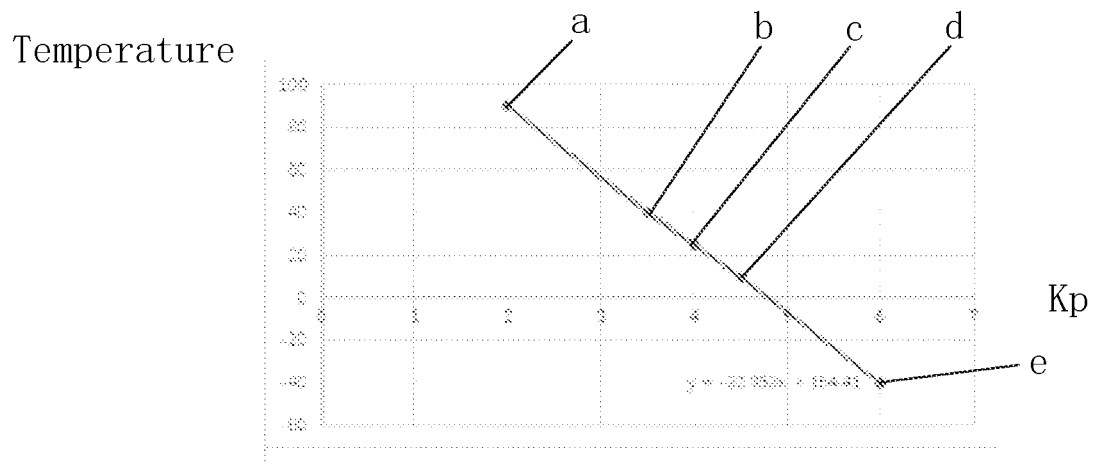
FIG. 4B to FIG. 4D are example linear curve plots of gain compensation constants Kp, Ki, and Kd.
Figure 4C:
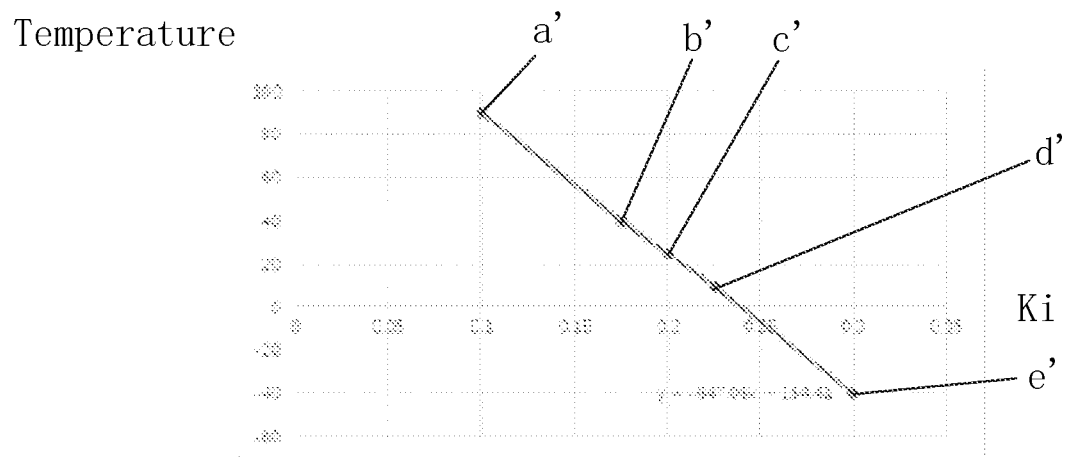
Figure 4D:
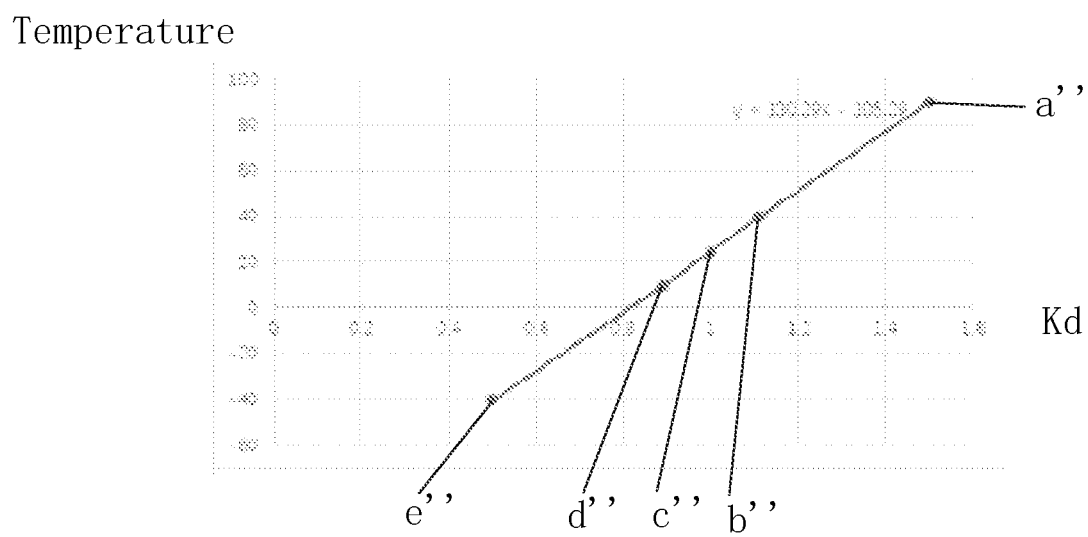

FIG. 4B to FIG. 4D show a schematic process of obtaining a group of values Kp, Ki, and Kd by simulating finite points. As an embodiment, the system of the present invention may be first placed in an environment where an ambient temperature is a high temperature (90 degrees Celsius) and a power supply of the motor has a normal voltage (13V), initial values are provided for Kp, Ki, and Kd, and the initial values of Kp, Ki, and Kd are input into software to simulate an operation status. Then, Kp, Ki, and Kd are adjusted/corrected according to a simulation condition until a group of suitable Kp, Ki, and Kd values are obtained. The environment of 90 degrees Celsius and 13V (a high temperature and a normal voltage) is selected at the beginning of the simulation. In this operation environment, a motion trajectory is observed on an instrument (such as an oscilloscope). If the motion of the motor is not stable in an operation process from an initial position to a target position (the operation trajectory oscillates, for example, an operation curve is unstable with a steep rise and a steep drop), the Kp value is first reduced until the oscillation is reduced to an extent within an acceptable range. In this case, the Kp value is 2, and a point a (a Kp start point) of the Kp value is illustrated in FIG. 4B. Then, an overshoot phenomenon (which usually occurs in the final stage of operation of the motor) of the motor is observed. If there is an overshoot phenomenon, the Kd value is reduced to slow down the overshoot phenomenon until the overshoot phenomenon does not appear. In this case, the Kd value is 1.5, and a point a' (a Kd start point) of the Kd value is illustrated in FIG. 4D. Finally, the Ki value is adjusted and is increased such that a static error (that is, an e(t) value at the last time instance) falls within an acceptable range. In this case, the Ki value is 0.1, and a point a" (a Ki start point) of the Ki value is illustrated in FIG. 4C. In this case, the optimal gain values of Kp, Ki, and Kd of the system in the environment of 90 degrees Celsius and 13V (a high temperature and a normal voltage) are obtained, that is, values of the three points a, a', and a" in FIG. 4B to FIG. 4D. Then, the power supply voltage 13V of the system remains unchanged and the ambient temperature is adjusted to −40 degrees Celsius, and the above steps are repeated to obtain the optimal gain values of Kp, Ki, and Kd of the system in an environment of −40 degrees Celsius and 13V (a low temperature and a normal voltage), that is, values of three points e, e', and e" in FIG. 4B to FIG. 4D. Then, point a and point e in FIG. 4B, point a' and point e' in FIG. 4C, and point a" and point e" in FIG. 4D are connected with straight lines, thereby forming a Kp value curve, a Ki value curve, and a Kd value curve. Since the optimal gain values of Kp, Ki, and Kd change basically linearly according to the temperature of the motor when the power supply voltage remains unchanged, the optimal gain values of Kp, Ki, and Kd at the power supply voltage 13V and other temperatures may be obtained directly from the above three straight lines. For example, as shown in FIG. 4B, when the power supply voltage is 13V and the temperature of the motor is 40 degrees Celsius, the optimal gain value of Kp may be directly read from the Kp value curve and is 3.5 (that is, a Kp value of a point b in FIG. 4B). When the power supply voltage is 13V and the temperature of the motor is 25 degrees Celsius, the optimal gain value of Kp may be directly read from the Kp value curve and is 4 (that is, a Kp value of a point c in FIG. 4B). When the power supply voltage is 13V and the temperature of the motor is 10 degrees Celsius, the optimal gain value of Kp may be directly read from the Kp value curve and is 4.5 (that is, a Kp value of a point d in FIG. 4B). Similarly, the optimal gain values (that is, values of points b', c', and d' in FIG. 4C) of Ki of the system at 13V and 40, 25, and 10 degrees Celsius may be read from the linear Ki value curve shown in FIG. 4C, and the optimal gain values (that is, values of points b", c", and d" in FIG. 4C) of Kd of the system at 13V and 40, 25, and 10 degrees Celsius may be read from the linear Kd value curve shown in FIG. 4D. Therefore, the linear curve in FIG. 4B represents the optimal Kp value curve of the system at the voltage 13V (a normal voltage) and different temperatures. The linear curve in FIG. 4C represents the optimal Ki value curve of the system at the voltage 13V and different temperatures. The linear curve in FIG. 4D represents the optimal Kd value curve of the system at the voltage 13V and different temperatures.

Similarly, within a range of the highest power supply voltage (for example, 16V) and the lowest power supply voltage (for example, 9V) of the motor, the above simulation steps are repeated per 1V voltage change unit, to obtain optimal value curves of Kp, Ki, and Kd at a series of different power supply voltages (16V, 15V, 14V, . . . , and 9V) and different temperatures. The optimal value curves correspond to the similar compensation function lines in FIG. 4B to FIG. 4D.

As can be seen from FIG. 4B to FIG. 4D, when the power supply voltage of the motor is constant, the Kp value and the Ki value increase with the decrease of the temperature of the motor, while the Kd value decreases with the decrease of the temperature of the motor. This is because:

(1) After the temperature of the motor decreases, material properties of a gear and a mechanical transmission part in the actuation apparatus 112 change at a low temperature, and fluidity of lubrication oil in the motor 122 becomes poor, which leads to increase of the resistance of a commutator of the motor 122. Due to the foregoing combined reasons, the torque of the motor 122 is increased, resulting in a slower start speed of the motor. Since the Kp gain value is used to adjust a PWM output voltage ratio, a higher voltage is required to drive the motor 122.

(2) After the temperature of the motor decreases, a friction force of the actuation apparatus 122 increases in the stop stage, and the problem of undershoot is prone to occur. Because the Ki gain value is used to eliminate a static error, it is necessary to increase the Ki gain value to increase an adjustment amount.

(3) After the temperature of the motor decreases, a rotation speed of the motor 122 changes with a hysteresis, and in this case, too many process adjustments are not required. Because the Kd gain value is used to adjust a dynamic rate, it is necessary to reduce the Kd gain value to reduce an adjustment amount of a dynamic rate.

Therefore, based on the above simulation operation steps, corresponding to function lines generated by different power supply voltages of the motor, three-dimensional optimal value curves of Kp, Ki, and Kd may be obtained respectively. In each curve, an X coordinate represents a power supply voltage of the motor, a Y coordinate represents a (ambient) temperature of the motor, and a Z coordinate represents a Kp/Ki/Kd value at a corresponding ambient temperature and power supply voltage. That is, K=f(x, y). Herein, K is a compensation constant, x is a power supply voltage of the motor, and y is a (ambient) temperature of the motor. When one of the power supply voltage and the (ambient) temperature of the motor is constant, Kp, Ki, and Kd are two-dimensional curves. In each curve, an X coordinate represents the other variable of the power supply voltage and the (ambient) temperature of the motor, and a Y coordinate represents the Kp/Ki/Kd value. That is, K=f(x). K is a compensation constant and x is the power supply voltage/(ambient) temperature of the motor. Based on the obtained Kp, Ki, and Kd value curves at a series of different power supply voltages and (ambient) temperatures of the motor, gain compensation tables shown in FIG. 4E to FIG. 4G may be generated.

A person skilled in the art can understand that since the first gain constant Kp, the second gain constant Ki, and the third gain constant Kd are obtained with reference to a predetermined motion trajectory of the motor from the initial position to the target position and a motion speed of the motor, in addition to the temperature and the power supply voltage of the motor, the motion trajectory of the motor and the motion speed of the motor are also considered in motor control of the present disclosure.

FIG. 4E to FIG. 4G show gain compensation tables corresponding to the gain compensation curves of FIG. 4B to FIG. 4D. As an embodiment, to facilitate generation and query of the gain compensation table, in the present disclosure, the two parameters affecting Kp, Ki, and Kd values, that is, the power supply voltage and the (ambient) temperature of the motor, are divided into multiple voltage intervals and temperature intervals, and Kp, Ki, and Kd values corresponding to different voltage intervals and temperature intervals are determined. Kp, Ki, and Kd gain compensation tables are generated based on these Kp, Ki, and Kd values, such that when the motor of the present disclosure is in different voltage intervals and temperature intervals, corresponding optimal Kp, Ki, and Kd gain values can be quickly and accurately obtained. Specifically, as shown in FIG. 4E to FIG. 4G, the first row of the gain compensation table represents power supply voltage intervals of the motor, the first column of the gain compensation table represents temperature intervals of the motor, and values in the middle represent specific Kp, Ki, and Kd gain values corresponding to a power supply voltage interval of the motor and a temperature interval of the motor. In the Kp gain compensation table shown in FIG. 4E, in the present disclosure, power supply voltages of the motor are divided into seven voltage intervals: 16V-15V, 15V-14V, 14V-13V, 13V-12V, 12V-11V, 11V-10V, and 10V-9V. Temperatures of the motor are divided into five temperature intervals: 90°-60°, 60°-40°, 40°-25°, 25°-10°, and 10°-(−)40°. When the power supply voltage of the motor is in the interval of 13V-12V and the temperature of the motor is in the interval of 90 degrees Celsius to 60 degrees Celsius, the Kp gain value is determined as the value 2 at the point a in FIG. 4B, and is filled in the compensation table in FIG. 4E. When the power supply voltage of the motor is in the interval of 12V-11V and the temperature of the motor is in the interval of 60 degrees Celsius to 40 degrees Celsius, the Kp gain value is determined as the value 3.5 at the point b in FIG. 4B, and is filled in the compensation table in FIG. 4E. By analogy, Kp values of the motor in different voltage intervals and temperature intervals are filled in the compensation table in FIG. 4E, to finally generate a complete Kp gain compensation table. Similarly, the Ki gain compensation table and the Kd gain compensation table in FIG. 4F and FIG. 4G are generated. As an embodiment, the compensation parameter tables in FIG. 4E to FIG. 4G are stored in a storage apparatus of the actuation apparatus control unit 114, and are retrieved by a processor of the actuation apparatus control unit 114.

Referring to FIG. 4A again, Kp, Ki, and Kd gain values obtained from simulation experiments are received respectively via connections 404, 405, and 406, and the received Kp, Ki, and Kd gain values are input into the compensation table memory 410 to generate a gain compensation table. The processor of the present disclosure dynamically obtains Kp, Ki, and Kd gain values from the gain compensation table based on a received real-time power supply voltage and temperature of the motor 122, thereby performing closed-loop control of the motor 122. For example, when receiving an ambient temperature of 50 degrees Celsius and a power supply voltage of 12V of the motor, the processor can retrieve a Kp value corresponding to interval 60°-40° and interval 12V-11V from the Kp gain compensation table in FIG. 4E, retrieve a Ki value corresponding to interval 60°-40° and interval 12V-11V from the Ki gain compensation table in FIG. 4F, and retrieve a Kd value corresponding to interval 60°-40° and interval 12V-11V from the Kd gain compensation table in FIG. 4G. The retrieved Kp, Ki, and Kd values are respectively output to the P operation function 422, the I operation function 424, and the D operation function 424 for operation, and an absolute PWM value or a relative PWM value is output for controlling operation of the motor 122. In addition, since parameter values of the Kp, Ki, and Kd can be dynamically set according to specific requirements of clients (for example, different clients have different requirements on oscillation ranges of operation trajectories of the motor, overshoot degrees, and static errors) in a simulation process, the Kp, Ki, and Kd gain compensation tables generated according to the present disclosure can meet specific requirements of different clients.

In FIG. 4E, corresponding to the power supply voltage of 13V-12V of the motor and the temperature of 90 degrees Celsius to 60 degrees Celsius of the motor, a corresponding Kp value is 2; corresponding to the power supply voltage of 13V-12V of the motor and the temperature of 60 degrees Celsius to 40 degrees Celsius of the motor, a corresponding Kp value is 3.5; corresponding to the power supply voltage of 13V-12V of the motor and the temperature of 40 degrees Celsius to 25 degrees Celsius of the motor, a corresponding Kp value is 4; corresponding to the power supply voltage of 13V-12V of the motor and the temperature of 25 degrees Celsius to 10 degrees Celsius of the motor, a corresponding Kp value is 4.5; and corresponding to the power supply voltage of 13V-12V of the motor and the temperature of 10 degrees Celsius to −40 degrees Celsius of the motor, a corresponding Kp value is 6.

In FIG. 4F, corresponding to the power supply voltage of 13V-12V of the motor and the temperature of 90 degrees Celsius to 60 degrees Celsius of the motor, a corresponding Ki value is 0.1; corresponding to the power supply voltage of 13V-12V of the motor and the temperature of 60 degrees Celsius to 40 degrees Celsius of the motor, a corresponding Ki value is 0.175; corresponding to the power supply voltage of 13V-12V of the motor and the temperature of 40 degrees Celsius to 25 degrees Celsius of the motor, a corresponding Ki value is 0.2; corresponding to the power supply voltage of 13V-12V of the motor and the temperature of 25 degrees Celsius to 10 degrees Celsius of the motor, a corresponding Ki value is 0.225; and corresponding to the power supply voltage of 13V-12V of the motor and the temperature of 10 degrees Celsius to −40 degrees Celsius of the motor, a corresponding Ki value is 0.3.

In FIG. 4G, corresponding to the power supply voltage of 13V-12V of the motor and the temperature of 90 degrees Celsius to 60 degrees Celsius of the motor, a corresponding Kd value is 1.5; corresponding to the power supply voltage of 13V-12V of the motor and the temperature of 60 degrees Celsius to 40 degrees Celsius of the motor, a corresponding Kd value is 1.11; corresponding to the power supply voltage of 13V-12V of the motor and the temperature of 40 degrees Celsius to 25 degrees Celsius of the motor, a corresponding Kd value is 1; corresponding to the power supply voltage of 13V-12V of the motor and the temperature of 25 degrees Celsius to 10 degrees Celsius of the motor, a corresponding Kd value is 0.89; and corresponding to the power supply voltage of 13V-12V of the motor and the temperature of 10 degrees Celsius to −40 degrees Celsius of the motor, a corresponding Kd value is 0.5.

FIG. 4E to FIG. 4G further show specific Kp, Ki, and Kd values obtained according to the methods shown in FIG. 4B to FIG. 4D at different temperatures and power supply voltages of the motor.

It should be noted that when obtaining of a group of suitable Kp, Ki, and Kd values, in the present disclosure, an operation trajectory required by a particular client may be selected to perform the simulation process, thus obtained Kp, Ki, and Kd values can meet a requirement of the particular client.

Referring to FIG. 4A again, at a node 422, an operation value of the P operation function is obtained according to the e(t) value received via the connection 403 and the Kp gain value obtained from the gain compensation table. Specifically, at the node 422, the actuation component control unit 114 multiplies e(t) by Kp to obtain the operation value of the P operation function. Kp represents a linear proportion of the position error e(t), and is used to adjust a motion direction and an approximate position of the motor.

At a node 424, an operation value of the I operation function is obtained according to the e(t) value received via the connection 403 and the Ki gain value obtained from the gain compensation table. Specifically, at the node 424, the actuation component control unit 114 integrates e(t) on the basis of time and then multiplies an integration result by Ki to obtain the operation value of the I operation function. Ki represents an integral of the error on the basis of time (integrating an error on the basis of time increases an accumulated error when an angle error is small, to correct the accumulated position error of the motor).

At a node 426, an operation value of the D operation function is obtained according to the e(t) value received via the connection 403 and the Kd gain value obtained from the gain compensation table. Specifically, at the node 426, the actuation component control unit 114 differentiates e(t) on the basis of time and then multiplies a differential result by Kd to obtain the operation value of the D operation function. Kd represents an angle error per unit time, that is, an angle difference between a previous time instance and a next time instance (which represents a rate change and is used to adjust a rate of the motor).

Then, a result of the P operation function, a result of the I operation function, and a result of the D operation function are respectively transferred to a node 414 via connections 411, 412, and 413 for synthesis, to obtain a PWM signal u(t) for driving the motor 415 to adjust a position of the motor at a current time instance and output y(t). y(t) includes an actual position value, a voltage value, and a current value of the motor at the current time instance. The actual position value of the motor at the current time instance is fed back to the node 402 via the connection 416, and the voltage value and the current value of the motor are used for fault detection and do not participate in operation of the PID algorithm.

In different operation stages of the motor (when the motor is in different position states), the result of the P operation function, the result of the I arithmetic operation, and the result of the D arithmetic operation have different contributions to the PWM signal u(t). When an error between the current position and the target position of the motor is large, for example, when the fuel filler lid/charging port lid/hidden handle just begins to move from the closed position to the open position, the result of the P operation function occupies the largest ratio in u(t), and the result of the I operation function and the result of the D operation function have very small contributions. When an error between the current position and the target position of the motor is small, for example, when the fuel filler lid/charging port lid/hidden handle moves from the closed position to the open position and is about to reach the open position, the result of the I operation function occupies the largest ratio in u(t), and the result of the P operation function and the result of the D operation function have very small contributions. When the motor is in an intermediate position state or stops, the result of the D operation function occupies the largest ratio in u(t), and the result of the P operation function and the result of the I operation function have very small contributions.

As can be seen from the description of the node operation flowchart, the PID algorithm can effectively correct an error and output corrected value according to a captured parameter (such as a power supply voltage, a temperature, and a position of the motor).

Figure 5:
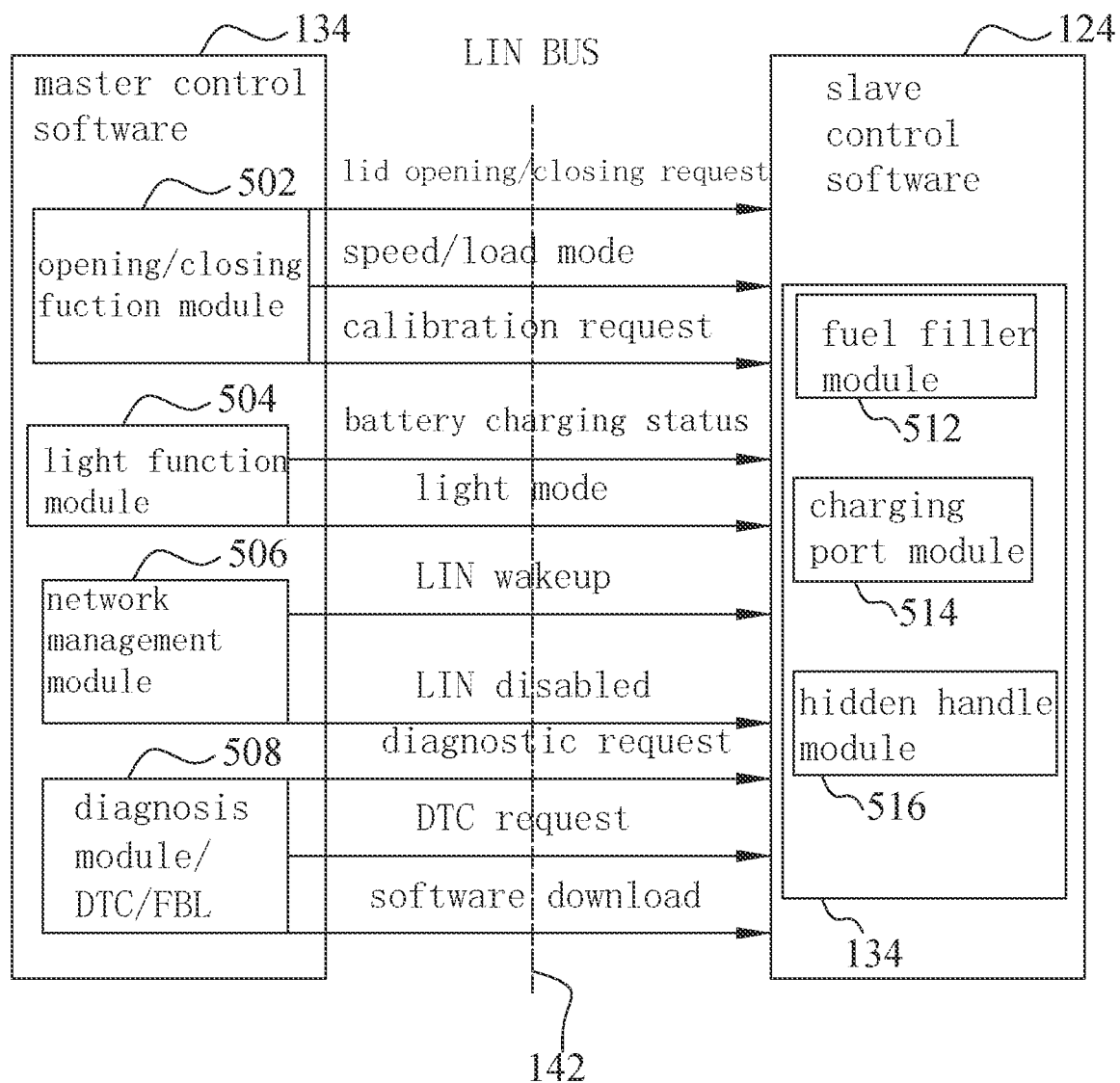
FIG. 5 is a schematic diagram showing that master control software sends a signal to slave control software.

FIG. 5 is a schematic diagram of sending a signal from the master control software 134 in the master node 104 to the slave control software 124 in the slave node 102. As shown in FIG. 5, the master control software 134 sends a signal to a charging port lid module 512/fuel filler lid module 514/hidden handle module 516 in the slave control software 124 via a bus (LIN BUS) 142. The master control software 134 includes an opening/closing function module 502, an light function module 504, a network management module 506, and a diagnosis module/DTC/FBL 508. The slave control software 134 includes the charging port lid module 512/fuel filler lid module 514/hidden handle module 516. The opening/closing function module 502 may send an opening/closing request to the charging port lid module 512/fuel filler lid module 514/hidden handle module 516.

When receiving an opening request, the charging port lid module 512/fuel filler lid module 514/hidden handle module 516 controls to open the charging port lid/fuel filler lid/hidden handle. The charging port lid module 512/fuel filler lid module 514/hidden handle module 516 sends a control signal to the actuation apparatus 112, and the actuation apparatus 112 should completely open the charging port lid/fuel filler lid/hidden handle within a predetermined time (for example, 2 seconds) after receiving the control signal. The charging port lid/fuel filler lid/hidden handle operates at a speed controlled by the PID algorithm. When detecting that the charging port lid/fuel filler lid/hidden handle is in the open position, the charging port lid module 512/fuel filler lid module 514/hidden handle module 516 should work to stop opening the charging port lid/fuel filler lid/hidden handle. When an obstacle is detected during opening of the charging port lid/fuel filler lid/hidden handle, if the obstacle has not be removed, the charging port lid module 512/fuel filler lid module 514/hidden handle module 516 should stop movement of the charging port lid/fuel filler lid/hidden handle within a predetermined time (for example, 1 second). When receiving a closing request (a closing request sent from the master node or a closing request generated due to pressing of a charging/fuel filler/hidden handle button, the charging port lid module 512/fuel filler lid module 514/hidden handle module 516 for closing the lid/hidden handle), the charging port lid module 512/fuel filler lid module 514/hidden handle module 516 should work to completely close the charging port lid/fuel filler lid/hidden handle within a predetermined time (for example, 2 seconds) after receiving the command. The charging port lid/fuel filler lid/hidden handle operates at a speed controlled by the PID algorithm. When detecting that the charging port lid/fuel filler lid/hidden handle is in the closed position, the charging port lid module 512/fuel filler lid module 514/hidden handle module 516 should work to stop closing the charging port lid/fuel filler lid/hidden handle. When the charging port lid module 512/fuel filler lid module 514/hidden handle module 516 detects an obstacle during closing, if the obstacle has not be removed, the charging port lid module 512/fuel filler lid module 514/hidden handle module 516 should work to stop movement of the charging port lid/fuel filler lid/hidden handle within a predetermined time (for example, 1 second). Besides, before closing the charging port lid/fuel filler lid/hidden handle, the charging port lid module 512/fuel filler lid module 514/hidden handle module 516 should verify that the charging port lid/fuel filler lid/hidden handle is in the open position. Besides, the opening/closing function module 502 may send a speed/load mode and a calibration request to the charging port lid module 512/fuel filler lid module 514/hidden handle module 516. When the opening/closing function module 502 sends a speed/load mode to the charging port lid module 512/fuel filler lid module 514/hidden handle module 516, the charging port lid module 512/fuel filler lid module 514/hidden handle module 516 may switch to a high speed or a low speed to meet a specific requirement of a client. When the opening/closing function module 502 sends a calibration request to the charging port lid module 512/fuel filler lid module 514/hidden handle module 516, the charging port lid module 512/fuel filler lid module 514/hidden handle module 516 can be automatically calibrated to learn of the open position and the closed position.

The light function module 504 may send a battery charging status and a light mode to the charging port lid module 512. When the charging port lid module 512 receives the battery charging status, an light is turned on. Specifically, when the battery is not charged, the light is turned off. When the battery is being charged, the light turns red. When the battery is fully charged, the light turns green. When a status is wrong or communication is lost, the light turns red and flashes. When receiving a light mode, the charging port lid module 512 selects two light thresholds. Specifically, when the light mode is in a day mode, brightness of the light is high. When the light mode is in a night mode, brightness of the light is low.

The network management module 506 may send LIN wakeup, LIN disabled, and diagnostic requests to the charging port lid module 512/fuel filler lid module 514/hidden handle module 516. Specifically, when receiving LIN wakeup, the charging port lid module 512/fuel filler lid module 514/hidden handle module 516 wakes up and performs communication. A LIN transceiver has a wakeup pin to support dominant status monitoring of a LIN BUS. When receiving LIN disabled, the charging port lid module 512/fuel filler lid module 514/hidden handle module 516 closes.

The diagnostic module/DTC/FBL 508 may send a diagnostic request, a DTC request, and software download request to the charging port lid module 512/fuel filler lid module 514/hidden handle module 516. Specifically, when receiving a diagnostic request, the charging port lid module 512/fuel filler lid module 514/hidden handle module 516 may respond and execute the diagnostic request from the master control software 134. When receiving a DTC request, the charging port lid module 512/fuel filler lid module 514/hidden handle module 516 may read, snapshot or extend date extraction. When receiving a software download request, the charging port lid module 512/fuel filler lid module 514/hidden handle module 516 supports a software architecture of the FBL 508 and supports a LIN message download sequence and a reprogramming requirement.

Figure 6:
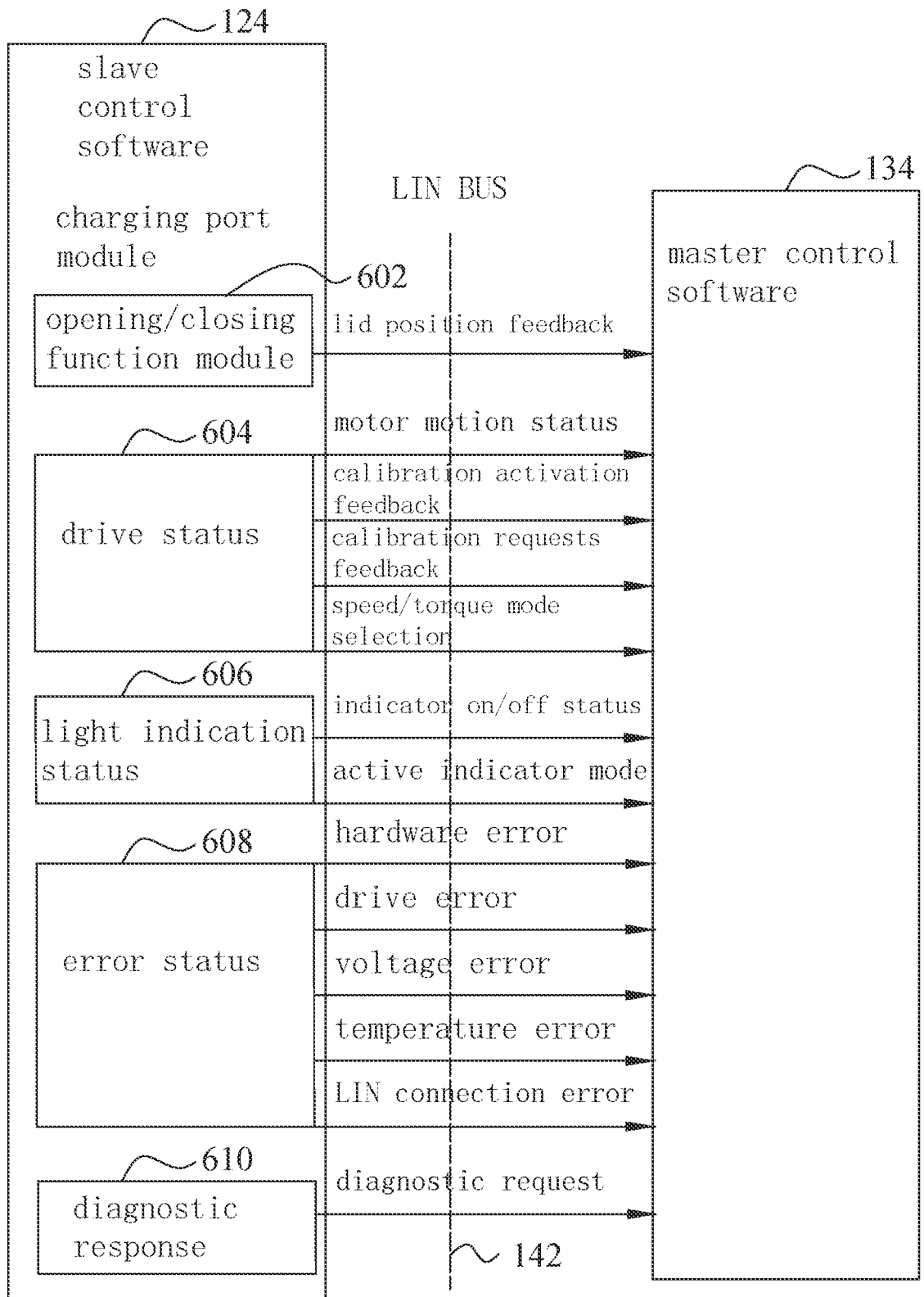
FIG. 6 is a schematic diagram showing that slave control software sends a signal to master control software.

FIG. 6 is a schematic diagram of sending a signal from the slave control software 124 in the slave node 124 to the master control software 134 in the master node. As shown in FIG. 6, the slave control software 124 sends a signal to the master control software 134 via a bus (LIN BUS) 142. The charging port lid module in the master control software 134 includes an opening/closing function module 602, a drive status 604, an light indicating status 606, an error report, and a diagnostic response 610.

The opening/closing function module 602 may send a charging port lid/fuel filler lid/hidden handle position feedback and a motor motion status to the master control software 134. Positions of the charging port lid/fuel filler lid/hidden handle include an open position, a closed position, a position between the open position and the closed position, and an unknown position. The motor motion status includes that the motor is running and the motor is not running.

The drive status 604 may send a signal on an operation status of the motor to the master control software 134, and the signal includes a calibration activation feedback, a calibration request feedback, and a speed/torque mode selection. The calibration activation feedback includes calibration activation and calibration inactivation. The calibration request feedback includes that a calibration request/no calibration request is received. The speed/torque mode selection includes that a low speed level is in an active state and a high speed level is in an active state.

The light indicating status 606 may send an light on/off status and a light active mode to the master control software 134. The light on/off status includes red light on/off, green light/off, light flashing, and a light fully on state. The active light mode includes that a day mode is in an active state and a night mode is in an active state.

The error status 608 may send a hardware error, a drive error, a voltage error, a temperature error, and a LIN connection error to the master control software 134. The hardware error includes a single-chip microcomputer failure, a motor driver failure, and a position detection apparatus failure. The single-chip microcomputer failure includes watchdog reset, unexpected shutdown, an EEOROM failure, and an SPI/I2C/UART error. The motor driver failure includes an overcurrent, an overvoltage, a voltage drop without drive, and a wrong motor direction. The position detection apparatus failure includes a signal frequency error, no signal output, and an incorrect detection apparatus configuration. The drive error includes position overshoot/undershoot and an unexpected motion. The voltage error includes an undervoltage/overvoltage. The temperature error includes an overtemperature. The LIN connection error includes a corresponding LIN error and loss of communication with a LIN master.

The diagnostic response 610 may send a diagnostic request to the master control software 134. The diagnostic request includes a TP layer message response, LIN diagnosis, and LIN FBL execution.

Figure 7:
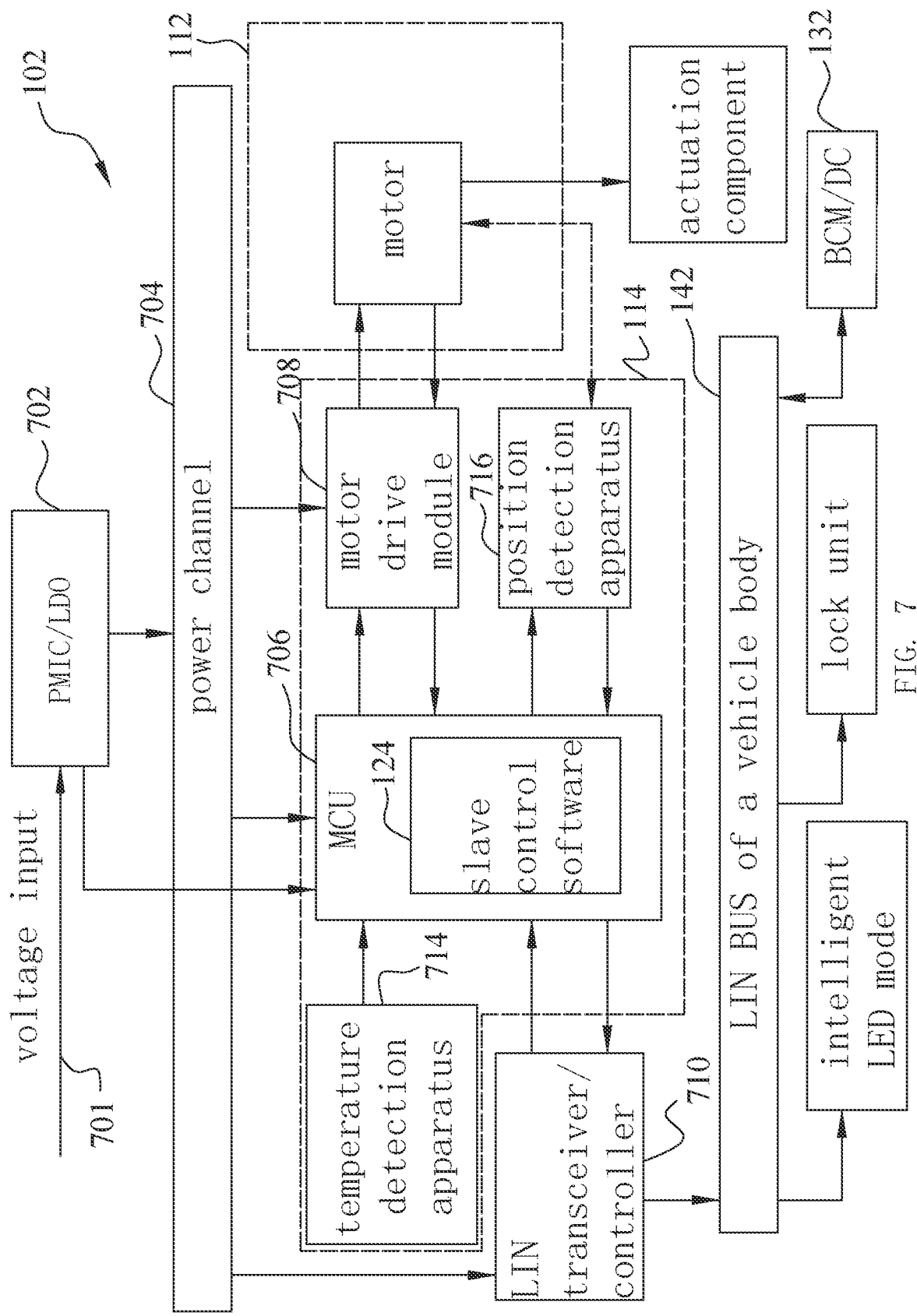
FIG. 7 is a structural block diagram of an actuation component unit.

FIG. 7 is a structural block diagram of the opening/closing actuation apparatus 102. As shown in FIG. 7, an input voltage of the vehicle is provided to a power module (PMIC/LDO) 702. The power module (PMIC/LDO) 702 includes a voltage regulator and power management, and may convert a voltage to an appropriate voltage and then provide power to an MCU (microcontroller unit) 706, a motor drive module 708, and a LIN transceiver/controller 710 through a power channel 704. The power module (PMIC/LDO) 702 also supplies a power supply voltage to an input interface of the microcontroller unit 706 via a connection 703. Under control of the microcontroller unit 706, the motor drive module 708 supplies a drive voltage (or a drive current) to the motor 122 and is in a communication connection to the motor 122. The motor 122 is in magnetic (communication) connection with a position detection apparatus 716, and the position detection apparatus 716 is configured to detect a position of the motor 122 and transmit detected position information to the microcontroller unit 706.

The microcontroller unit 706 includes a processor, an input/output interface, a memory, or the like, and the memory may be configured to store the slave control software 124. The microcontroller unit 706 is in a communication connection to the power module 702, a temperature detection apparatus 714, the position detection apparatus 716, the motor drive module 708, and the LIN transceiver/controller, to receive and/or transmit signals from/to these components.

Specifically, after converting a voltage input 701 into a suitable voltage, the power module 702 provides the converted voltage to the power drive module 708 and the microcontroller unit 706 through the power channel 704. The temperature detection apparatus 714 is configured to detect a (ambient) temperature of the motor. As an embodiment, the microcontroller unit 706, the power drive module 702, the motor drive module 708, the temperature detection apparatus 714, and the position detection apparatus 716 are all arranged on a same circuit board. The temperature detection apparatus 714 is configured to detect a (ambient) temperature of the motor, and the position detection apparatus 716 is configured to detect a current position of the motor. As an example, the position detection apparatus 716 is a Hall sensor.

As shown in FIG. 7, the microcontroller unit 706 and the LIN transceiver/controller 710 perform bidirectional communication through the channel (LIN BUS) 142. The LIN transceiver/controller 710 can handle transmission of a payload and reception of a signal conforming to a LIN physical layer standard in ISO9141 and LCC and TP layer protocols in LIN2.1.

Figure 8:
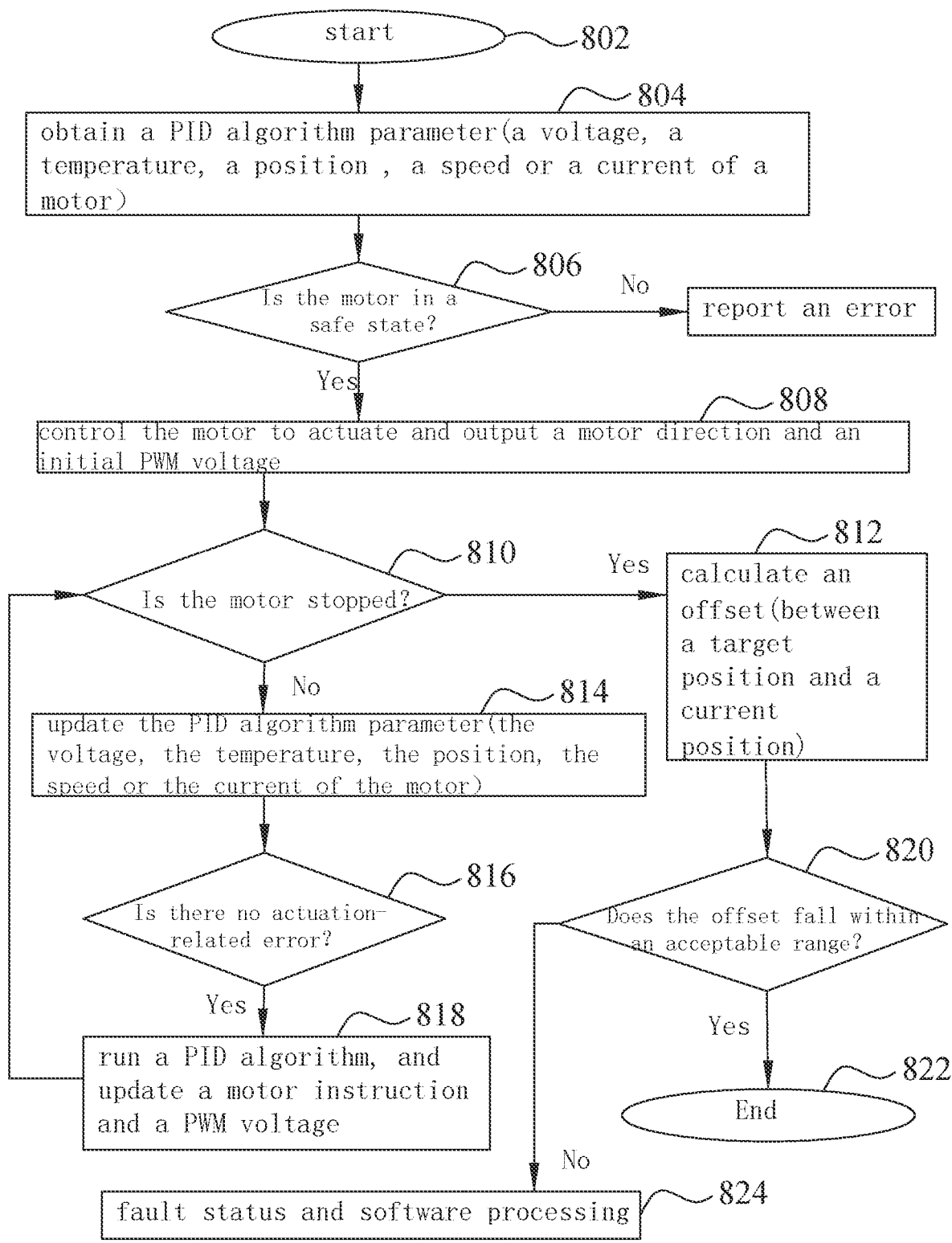
FIG. 8 is a flowchart showing that an actuator control unit controls an actuation component unit.

FIG. 8 is a flowchart showing how does an actuation component control unit 114 control an actuation component unit 112.

As shown in FIG. 8, a program enters a block 804 from a start node 802 of a closed-loop control loop. In the block 804, the actuation component control unit 114 obtains an initial value of a PID algorithm parameter (a power supply voltage, a temperature, or a position of the motor) and proceeds to a block 806. In the block 806, the actuation component control unit 114 detects whether the motor is in an actuation safe state. If it is detected that the motor is not in the actuation safe state, an error is reported and the PID control procedure is ended. If it is detected that the motor is in the actuation safe state, process proceeds to a block 808.

In the block 808, the actuation component control unit 114 controls the motor to actuate and outputs a motor direction and an initial PWM voltage, and then proceeds to a block 810. In the block 810, the actuation component control unit 114 detects whether the motor is stopped. If it is detected in the block 810 that the motor is stopped, process proceeds to a block 812. In the block 812, an offset (a difference between a target position and a current position) is calculated. If the offset falls within an error range of the target position, process proceeds to a node 822 to end the PID control procedure. If the offset does not fall within the error range of the target position, process proceeds to a block 824. In this case, it is considered that a fault exists, and subsequent processing is performed by a diagnostic part of the software. If it is detected in the block 810 that the motor is not stopped, process proceeds to a block 814. In the block 814, a PID algorithm parameter (a power supply voltage, a temperature, or a position of the motor) is updated and process proceeds to a block 816. It is detected in the block 816 whether there is no actuation-related error. If no actuation-related error is detected in the block 816, process proceeds to a block 818, the PID algorithm is run, and a motor direction and a PWM voltage are updated.

Figure 9A:
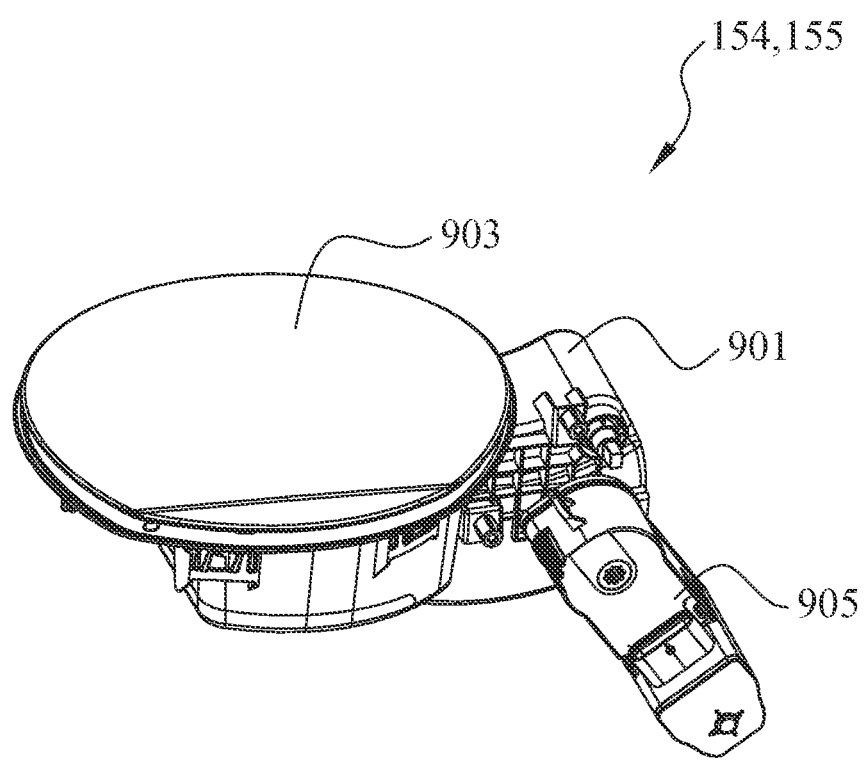
FIG. 9A and FIG. 9B are schematic diagrams of a mechanical structure of a fuel filler lid/charging port lid system of a vehicle according to an embodiment of the present disclosure.
Figure 9B:
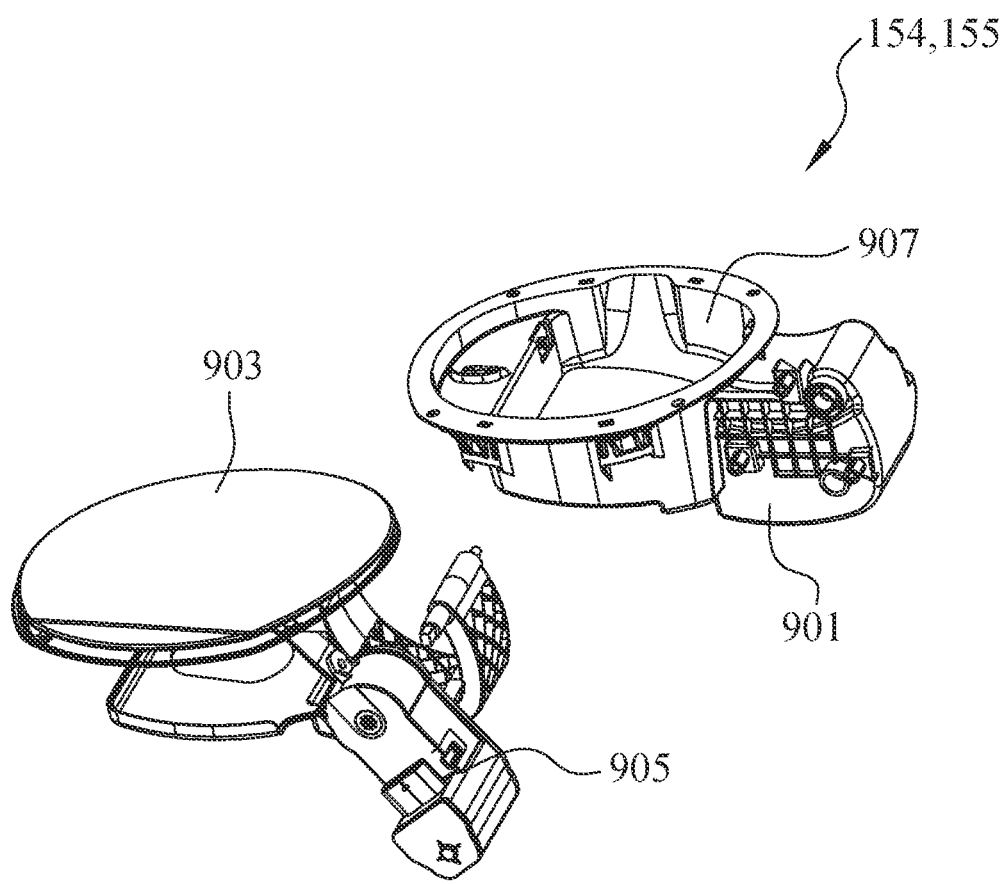

FIG. 9A and FIG. 9B are schematic diagrams of a mechanical structure of a fuel filler lid/charging port lid system of a vehicle according to an embodiment of the present disclosure. Specifically, the fuel filler lid/charging port lid system includes a housing 901, a lid 903, and a motor 905. The housing 901 is provided with an opening 907, and the lid 903 can cover or seal the opening 907. An output end (not shown) of the motor 905 is connected to the lid 903 to drive the lid 903 to rotate between the open position and the closed position, thereby covering or sealing the opening 907.

Figure 10A:
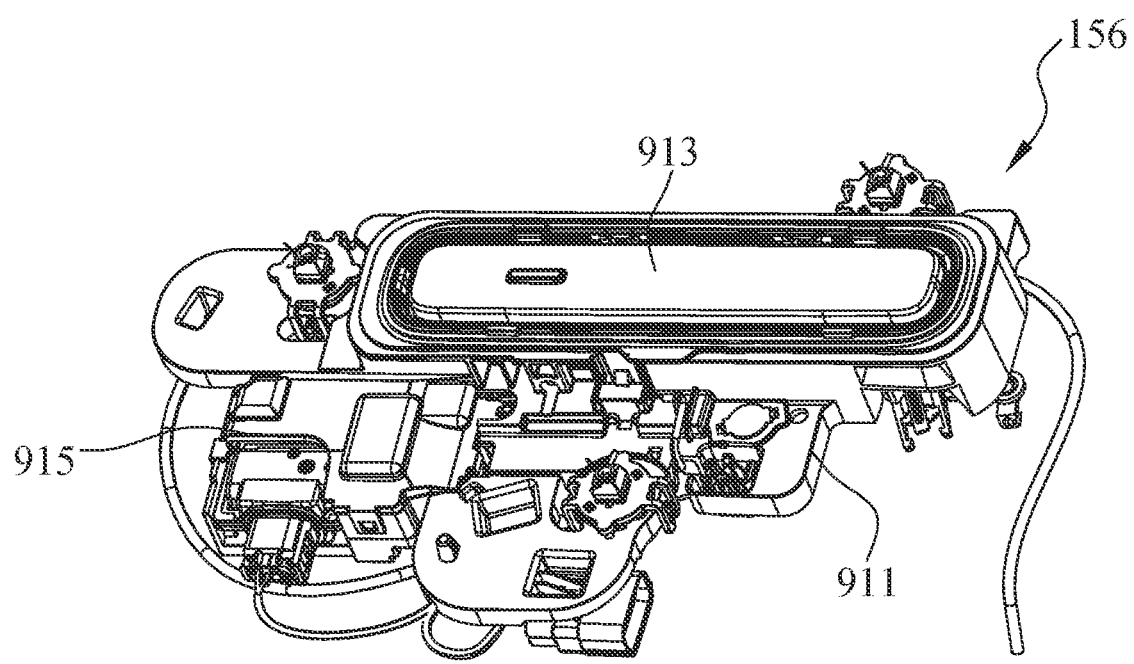
FIG. 10A and FIG. 10B are schematic diagrams of a mechanical structure of a hidden vehicle handle system according to an embodiment of the present disclosure.
Figure 10B:
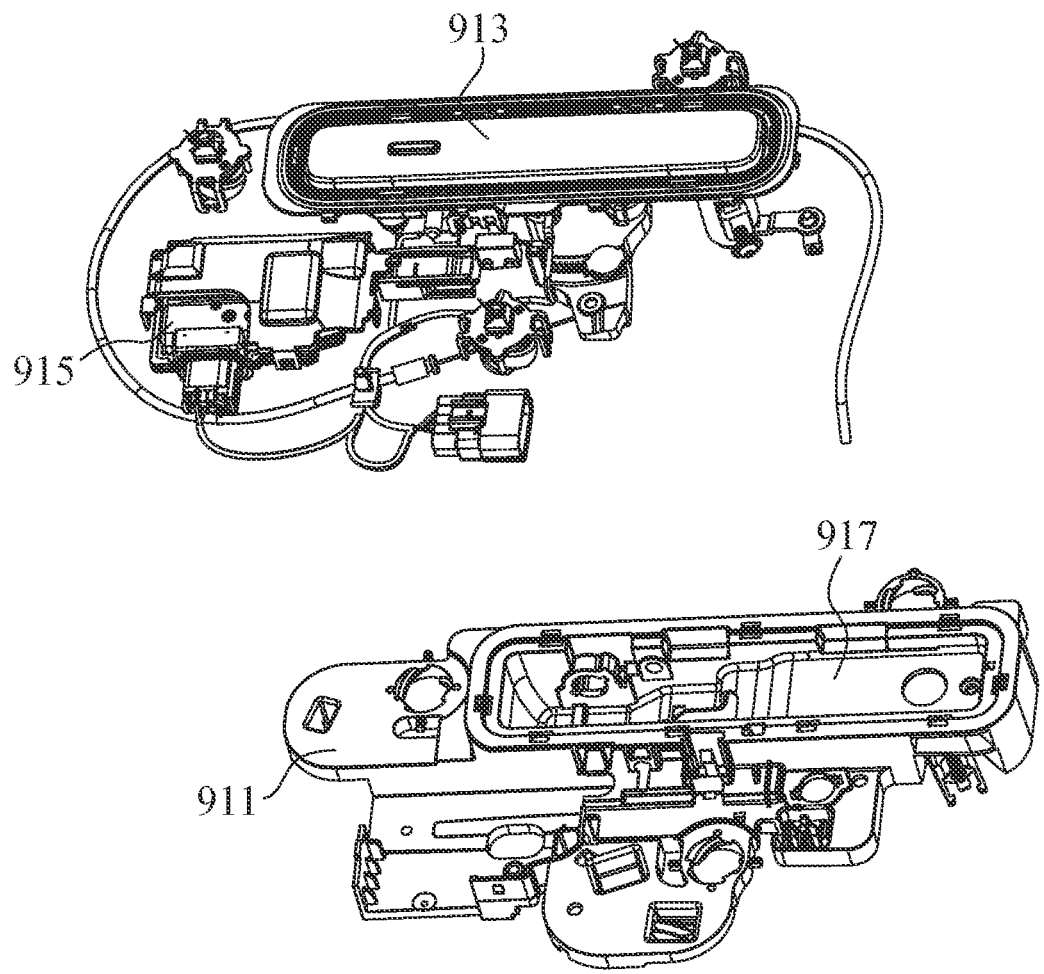

FIG. 10A and FIG. 10B are schematic diagrams of a mechanical structure of a vehicle handle system according to an embodiment of the present disclosure. Specifically, the vehicle handle system includes a housing 911, a hidden handle 913, and a motor 915. The housing 911 is provided with an opening 917. When the hidden handle 913 is in the closed position, the hidden handle 913 is located within the opening 917. When the hidden handle 913 is in the open position, the hidden handle 913 protrudes out of the opening 917. An output end (not shown) of the motor 915 is connected to the hidden handle 913 to drive the hidden handle 913 to rotate between the open position and the closed position around a rotating shaft.

Figure 11:
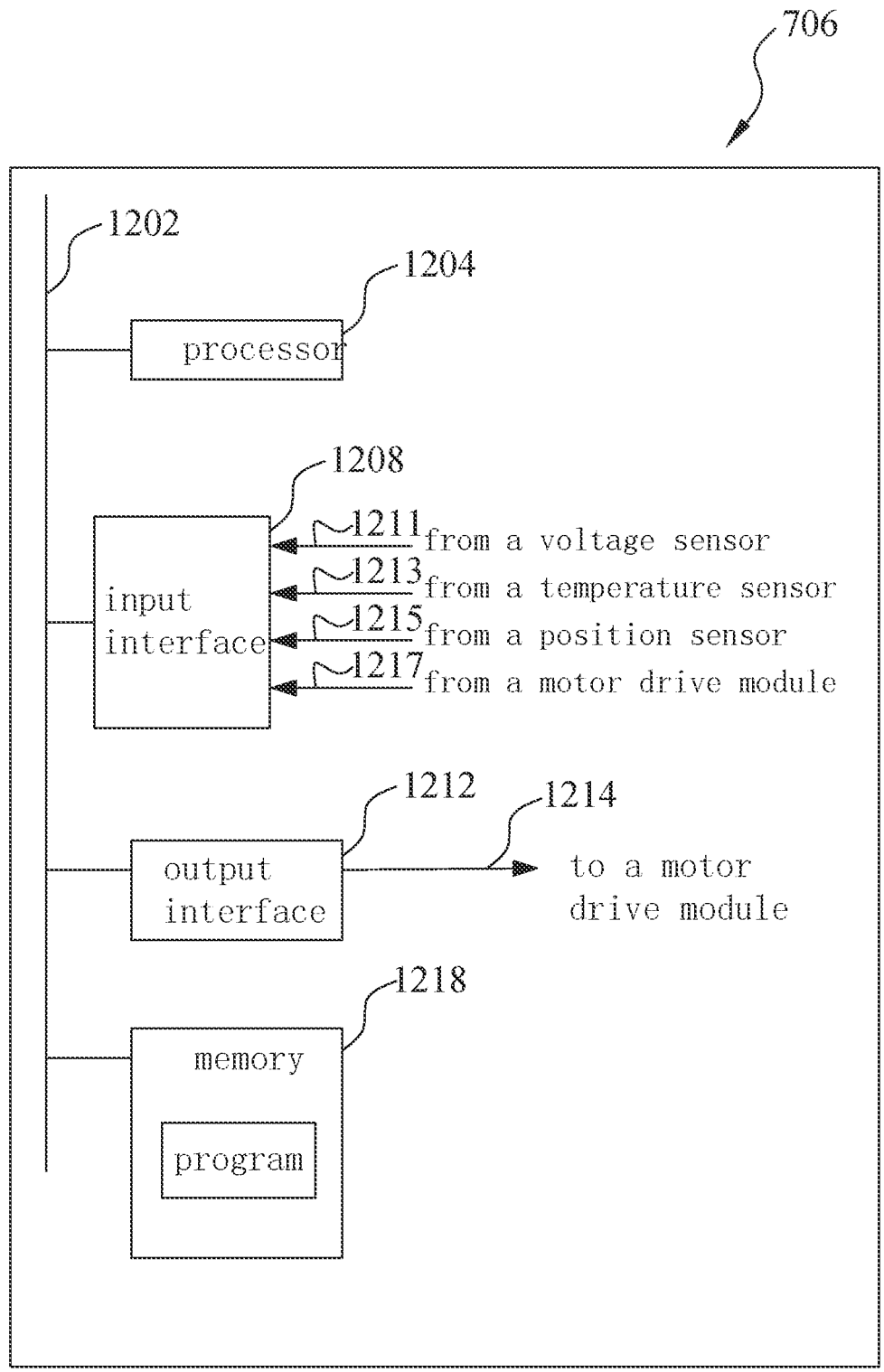
FIG. 11 is a schematic diagram of an internal structure of an MCU in FIG. 7.

FIG. 11 is a schematic structural block diagram of the microcontroller unit 706 in FIG. 7.

As shown in FIG. 11, the control apparatus 202 includes a bus 1202, a processor 1204, an input interface 1208, an output interface 1212, and a memory 1218 having a control program. Components in the control apparatus 202, including the processor 1204, the input interface 1208, the output interface 1212, and the memory 1218, are in a communication connection to the bus 1202, such that the processor 1204 can control operation of the input interface 1208, the output interface 1212, and the memory 1218. Specifically, the memory 1218 is configured to store a program (for example, the slave control software 124 in FIG. 1, or the charging port lid module 512/fuel filler lid module 514/hidden handle module 516 in FIG. 5), instructions, and data. The processor 1204 reads the program, instructions, and data from the memory 1218 and may write data to the memory 1218. The processor 1204 controls operation of the memory 1218, the input interface 1208, and the output interface 1212 by reading the program and instructions from the memory 1218. The input interface 1208 may convert a signal received from an external device into a signal that the processor 1204 may recognize and process, while the output interface 1212 may convert a signal output by the processor 1204 into a signal suitable for an external device. As shown in FIG. 11, the output interface 1212 is in a communication connection to the motor drive module 708 via a connection 1214 to output a control signal to the motor drive module 708. The input interface 1208 receives operation parameters of the power drive module 702, the temperature detection apparatus 714, the position detection apparatus 716, and the motor drive module 708 via connections 1211, 1213, 1215, and 1217, and converts the received operation parameters into digital signals identifiable and operable by the processor 1204. These digital signals are stored in the memory 1218 for post-processing. By executing the program and instructions in the memory 1218, the processor 1204 executes the program to complete the operation in the flowchart shown in FIG. 8 to control the operation of the motor 122.

In the present disclosure, the processor 1204 controls the memory 1218 to store: the slave control software 124 in FIG. 1; the compensation table in FIG. 4A; programs for calculating 402, 414, 422, 424, and 426 in FIG. 4A; the compensation parameter tables in FIG. 4E to FIG. 4G; and a program for executing the procedure in FIG. 8.

In the fuel filler lid/charging port lid system/hidden handle system of the vehicle of the present disclosure, the actuation apparatus control unit 114 controls the actuation apparatus 112, thereby precisely controlling the actuation component 121. Specifically, on the one hand, the actuation apparatus control unit 114 may be in a communication connection to the vehicle body 104 through the bus 142, so as to send a signal to the vehicle body 104 or receive a signal from the vehicle body 104. On the other hand, the actuation apparatus control unit 114 is in a communication connection to the power module (PMIC/LDO) 702, the temperature detection apparatus 714, the position detection apparatus 716, and the motor drive module 708 in the opening/closing actuation apparatus 102, to obtain parameters, and may perform closed-loop control of or adjust the motor 122 based on one of these parameters.

Although only some features of the present disclosure are illustrated and described herein, those skilled in the art may make various improvements and changes. Therefore, it should be understood that the appended claims are intended to encompass all the above improvements and changes that fall within the essential spirit and scope of the present disclosure.

What is claimed is:

1. A system for controlling a vehicle having an opening/closing actuation apparatus, the opening/closing actuation apparatus comprising:

an actuation apparatus comprising an actuation component and a driving motor, wherein the driving motor is configured to drive the actuation component; and
an actuation apparatus control unit is configured to control the actuation apparatus,
wherein the actuation apparatus control unit is configured to provide a driving output voltage signal to drive the driving motor to move between an open position and a closed position, the actuation apparatus control unit is configured to adjust the driving output voltage signal in a closed-loop manner, and adjustment of the driving output voltage signal is based at least in part on a temperature change and a power supply voltage change of the driving motor,
wherein the actuation apparatus control unit is configured to control the actuation apparatus in a closed-loop manner, and
wherein the opening/closing actuation apparatus of the vehicle is set as a slave node, and the slave node communicates with a master node of the vehicle using a channel.

2. The system for controlling a vehicle according to claim 1, wherein
adjustment of the driving output voltage signal is based on a speed change in a motion trajectory of the driving motor.

3. The system for controlling a vehicle according to claim 1, wherein
adjustment of the driving output voltage signal is based on an error e(t) between a target position r(t) of the driving motor and a current position y(t) of the driving motor.

4. The system for controlling a vehicle according to claim 3, wherein
adjustment of the driving output voltage signal is based on superposition of variables of three functions comprising:
(1) a first function: a proportional function of the error e(t) at the current time;
(2) a second function: an accumulative function of errors e(t) at multiple time instances; and
(3) a third function: a deviating function of the error e(t) at a time instance.

5. The system for controlling a vehicle according to claim 4, wherein
the variables of the three functions have respective gain constants comprising:
(1) a first gain constant: Kp;
(2) a second gain constant: Ki; and
(3) a third gain constant: Kd.

6. The system for controlling a vehicle according to claim 5, wherein
the first gain constant Kp, the second gain constant Ki, and the third gain constant Kd are obtained based on a power supply voltage parameter and an ambient temperature parameter.

7. The system for controlling a vehicle according to claim 5, wherein
the first gain constant Kp, the second gain constant Ki, and the third gain constant Kd are obtained based on a preset motion trajectory of the driving motor from an initial position to the target position.

8. The system for controlling a vehicle according to claim 5, further comprising:
a compensation table memory storing a compensation table, wherein compensation values of the first gain constant Kp, the second gain constant Ki, and the third gain constant Kd are stored in the compensation table; and the actuation apparatus control unit is configured to obtain the compensation values of the first gain constant Kp, the second gain constant Ki, and the third gain constant Kd from the compensation table according to a temperature and a power supply voltage of the driving motor at the current time.

9. The system for controlling a vehicle according to claim 1, wherein the actuation apparatus control unit comprises a processor configured to perform a closed-loop control or regulation of the driving motor.

10. The system for controlling a vehicle according to claim 1, wherein the actuation apparatus control unit is provided with slave control software.

11. The system for controlling a vehicle according to claim 1, wherein the actuation apparatus is configured to drive a fuel filler lid apparatus/charging port lid apparatus/hidden handle apparatus of the vehicle.

12. The system for controlling a vehicle according to claim 11, wherein the actuation apparatus, the actuation apparatus control unit, and the fuel filler lid apparatus/charging port lid apparatus/hidden handle apparatus of the vehicle are physically arranged in one unit.

13. The system for controlling a vehicle according to claim 11, wherein the actuation component is configured to drive the fuel filler lid apparatus, the charging port lid apparatus, or the hidden handle apparatus, such that the fuel filler lid apparatus, the charging port lid apparatus, or the hidden handle apparatus is configured to moves between the open position and the closed position.

14. The system for controlling a vehicle according to claim 11, wherein the fuel filler lid apparatus, the charging port lid apparatus, or the hidden handle apparatus has a closed position lower limit and an open position lower limit;

a closed position state is set between the calibration closed position and the closed position lower limit;

an intermediate position state is set between the closed position lower limit and the open position lower limit; and an open position state is set between the open position lower limit and the calibration open position, wherein according to a position state of the fuel filler lid apparatus, the charging port lid apparatus, or the hidden handle apparatus, the system for controlling a vehicle is configured to control the fuel filler lid apparatus, the charging port lid apparatus, or the hidden handle apparatus to make them close and open.

15. The system for controlling a vehicle according to claim 1, wherein the actuation apparatus control unit is configured to regulate and controls the driving motor by changing a driving voltage.

16. A system for controlling a vehicle having an opening/closing actuation apparatus, the opening/closing actuation apparatus comprising:

an actuation apparatus comprising an actuation component and a driving motor, wherein the driving motor is configured to drive the actuation component, and wherein the actuation apparatus is configured to drive a fuel filler lid apparatus, the charging port lid apparatus, or the hidden handle apparatus of the vehicle; and an actuation apparatus control unit for controlling the actuation apparatus, wherein the actuation apparatus control unit configured to control the actuation apparatus in a closed-loop manner, and wherein the opening/closing actuation apparatus of the vehicle is set as a slave node, and the slave node communicates with a master node of the vehicle using a channel, wherein the fuel filler lid apparatus, the charging port lid apparatus, or the hidden handle apparatus has a calibration closed position and a calibration open position, and wherein the actuation component drives the fuel filler lid apparatus, the charging port lid apparatus, or the hidden handle apparatus is configured to move between the calibration closed position and the calibration open position.

17. A system for controlling a vehicle having an opening/closing actuation apparatus, the opening/closing actuation apparatus comprising:

an actuation apparatus comprising an actuation component and a driving motor, wherein the driving motor is configured to drive the actuation component, an actuation apparatus control unit for controlling the actuation apparatus, wherein actuation apparatus control nit is configured to provide a driving output voltage signal to drive the driving motor to move between an open position and a closed position, the actuation apparatus control unit being configured to adjust the driving output voltage signal in a closed-loop manner, and adjustment of the driving output voltage signal is based on a temperature change and a power supply voltage change of the driving motor;

a temperature detection apparatus configured to detect a temperature of the driving motor;

a position detection apparatus configured to detect a position of the driving motor; and a voltage detection apparatus configured to detect a voltage of the driving motor, wherein the actuation apparatus control unit is configured to control the actuation apparatus in a closed-loop manner, and wherein the opening/closing actuation apparatus of the vehicle is set as a slave node, and the slave node communicates with a master node of the vehicle using a channel.

18. The system for controlling a vehicle according to claim 16, wherein adjustment of the driving output voltage signal is based on a speed change in a motion trajectory of the driving motor.

19. The system for controlling a vehicle according to claim 16, wherein adjustment of the driving output voltage signal is based on an error e(t) between a target position r(t) of the driving motor and a current position y(t) of the driving motor.

20. The system for controlling a vehicle according to claim 16, wherein actuation apparatus control unit comprises a processor configured to perform a closed-loop control or regulation of the driving motor.

* * * * *